US011151395B2

(12) United States Patent
Takahama

(10) Patent No.: US 11,151,395 B2
(45) Date of Patent: Oct. 19, 2021

(54) ROADSIDE OBJECT DETECTION DEVICE, ROADSIDE OBJECT DETECTION METHOD, AND ROADSIDE OBJECT DETECTION SYSTEM

(71) Applicant: Hitachi Astemo, Ltd., Hitachinaka (JP)

(72) Inventor: Taku Takahama, Yokohama (JP)

(73) Assignee: Hitachi Astemo, Ltd., Hitachinaka (JP)

(*) Notice: Subject to any disclaimer, the term of this patent is extended or adjusted under 35 U.S.C. 154(b) by 0 days.

(21) Appl. No.: 16/628,105

(22) PCT Filed: Jul. 10, 2018

(86) PCT No.: PCT/JP2018/025977
§ 371 (c)(1),
(2) Date: Jan. 2, 2020

(87) PCT Pub. No.: WO2019/031137
PCT Pub. Date: Feb. 14, 2019

(65) Prior Publication Data
US 2020/0125865 A1    Apr. 23, 2020

(30) Foreign Application Priority Data

Aug. 7, 2017 (JP) .............................. JP2017-152342

(51) Int. Cl.
*G06K 9/00* (2006.01)
*G06T 7/73* (2017.01)
(Continued)

(52) U.S. Cl.
CPC ............ *G06K 9/00805* (2013.01); *B60R 1/00* (2013.01); *B60W 30/09* (2013.01);
(Continued)

(58) Field of Classification Search
CPC .. G06K 9/00805; G06K 9/00798; G06T 7/73; G06T 7/593; G06T 2207/30261;
(Continued)

(56) References Cited

U.S. PATENT DOCUMENTS 9,676,330 B2 * 6/2017 Takemae .................. G06T 7/60
2009/0030613 A1 1/2009 Kataoka et al.
(Continued)

FOREIGN PATENT DOCUMENTS

JP    2003-58997 A    2/2003
JP    2005-10891 A    1/2005
(Continued)

OTHER PUBLICATIONS

Japanese-language Office Action issued in Japanese Application No. 2019-535040 dated Sep. 1, 2020 with English translation (five (5) pages).
(Continued)

*Primary Examiner* — Maria E Vazquez Colon
(74) *Attorney, Agent, or Firm* — Crowell & Moring LLP

(57) ABSTRACT

The roadside object detection device, roadside object detection method, and roadside object detection system according to the present invention make it possible to accurately detect roadside objects by: determining a first feature value regarding positional relationship between a host vehicle and a roadside object candidate and a second feature value regarding a height of the roadside object candidate, based on external environment information acquired by an external environment recognition unit; determining a height-related threshold for identifying the roadside object candidate as a roadside object, based on the first feature value; and identifying the roadside object candidate as a roadside object when the second feature value exceeds the threshold.

19 Claims, 20 Drawing Sheets

(51) Int. Cl.
  *G06T 7/593* (2017.01)
  *B60R 1/00* (2006.01)
  *B60W 30/09* (2012.01)
  *G08G 1/16* (2006.01)

(52) U.S. Cl.
  CPC .......... *G06K 9/00798* (2013.01); *G06T 7/593* (2017.01); *G06T 7/73* (2017.01); *G08G 1/165* (2013.01); *B60W 2554/00* (2020.02); *G06T 2207/30261* (2013.01)

(58) Field of Classification Search
  CPC ..... B60R 1/00; B60W 30/09; B60W 2554/00; G08G 1/165
  See application file for complete search history.

(56) References Cited

U.S. PATENT DOCUMENTS

| | | | |
|---|---|---|---|
| 2009/0143951 A1* | 6/2009 | Takahashi | B60T 7/22 701/70 |
| 2015/0294160 A1 | 10/2015 | Takahashi et al. | |
| 2016/0132734 A1 | 5/2016 | Lee | |
| 2016/0195615 A1* | 7/2016 | Tobeta | G01S 7/4808 701/70 |
| 2018/0154871 A1* | 6/2018 | Prasad | B60T 7/22 |
| 2019/0061750 A1* | 2/2019 | Tamura | B60W 30/0956 |

FOREIGN PATENT DOCUMENTS

| | | |
|---|---|---|
| JP | 2010-20476 A | 1/2010 |
| JP | 2014-2608 A | 1/2014 |
| JP | 2017-33366 A | 2/2017 |
| JP | 2017-36981 A | 2/2017 |
| WO | WO 2017/022079 A1 | 2/2017 |
| WO | WO 2017/022080 A1 | 2/2017 |
| WO | WO 2017/132278 A1 | 8/2017 |

OTHER PUBLICATIONS

International Preliminary Report on Patentability (PCT/IB/326 & PCT/IB/373) issued in PCT Application No. PCT/JP2018/025977 dated Feb. 20, 2020 including English translation of document C2 (Japanese-language Written Opinion (PCT/ISA/237) previously filed on Jan. 2, 2020) (13 pages).
International Search Report (PCT/ISA/210) issued in PCT Application No. PCT/JP2018/025977 dated Oct. 16, 2018 with English translation (five pages).
Japanese-language Written Opinion (PCT/ISA/237) issued in PCT Application No. PCT/JP2018/025977 dated Oct. 16, 2018 (four pages).
Japanese language Office Action issued in Japanese Application No. 2019-535040 dated Jan. 12, 2021 with partial English translation (five (5) pages).
Extended European Search Report issued in European Application No. 18843817.0 dated Mar. 24, 2021 (eight (8) pages).

* cited by examiner

ROADSIDE OBJECT DETECTION DEVICE, ROADSIDE OBJECT DETECTION METHOD, AND ROADSIDE OBJECT DETECTION SYSTEM

TECHNICAL FIELD

The present invention relates to a roadside object detection device, a roadside object detection method, and a roadside object detection system.

BACKGROUND ART

Patent Document 1 discloses a roadside object detection apparatus. The roadside object detection apparatus includes: a unit configured to analyze captured images, and to detect height information of an object in the captured images in a neighboring region having a distance less than a threshold from a vehicle having the roadside object detection apparatus installed; a unit configured to detect a change of a height of a road surface due to the roadside object from the height information in the neighboring region; a unit configured to determine positions having the change of the height detected as feature points of the roadside object, and to extrapolate the feature points into a far-off region having a distance greater than or equal to the threshold from the vehicle, based on a road model; and a unit configured to set a search range for the roadside object in the far-off region based on a virtual line that is obtained by the extrapolated feature points, and to detect the roadside object in the far-off region based on the search range.

REFERENCE DOCUMENT LIST

Patent Document

Patent Document 1: JP 2014-002608 A

SUMMARY OF THE INVENTION

Problem to be Solved by the Invention

However, the road model, which is a formula of coefficients representing a road form, may sometimes decrease in accuracy. In this case, the roadside object detection apparatus disclosed in Patent Document 1 may fail to perform accurate roadside object detection.

The present invention has been made in view of such conventional circumstances, and an object thereof is to provide a roadside object detection device, a roadside object detection method, and a roadside object detection system, which allow for reducing or preventing failure of accurate roadside object detection.

Means for Solving the Problem

According to an aspect of the present invention, a height-related threshold for identifying a roadside object candidate as a roadside object is determined based on a first feature value regarding positional relationship between the host vehicle and the roadside object candidate.

Effects of the Invention

According to the present invention, it is possible to reduce or prevent failure of accurate roadside object detection.

MODES FOR CARRYING OUT THE INVENTION

Hereinafter, embodiments of a roadside object detection device, a roadside object detection method, and a roadside object detection system according to the present invention will be described with reference to the drawings.

Figure 1:
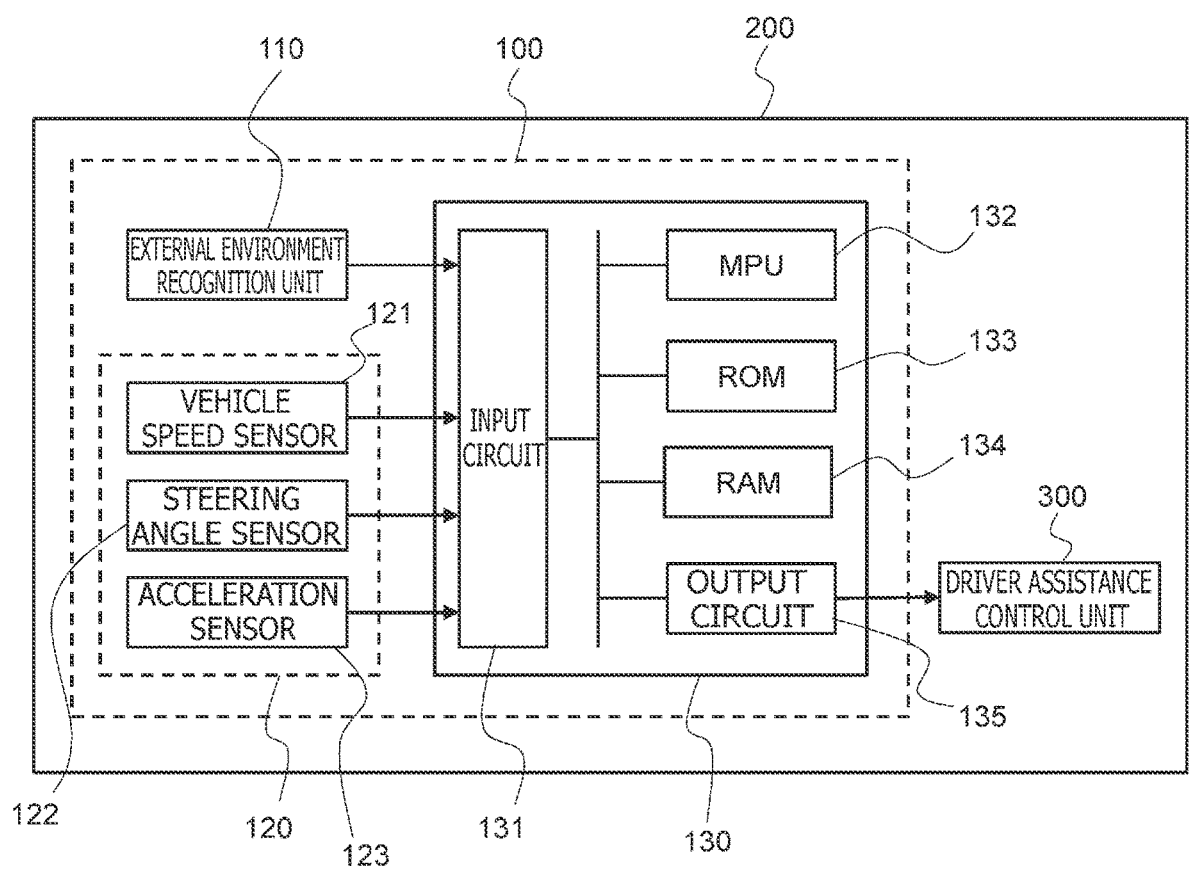
FIG. 1 is a block diagram of hardware configuration of a roadside object detection system according to the present invention.

FIG. 1 is a block diagram of hardware configuration of a roadside object detection system according to an embodiment of the present invention.

A roadside object detection system 100 is installed in a vehicle 200 and configured to detect a roadside object such as a curbstone, and provides information on the detected roadside object to a driver assistance control unit 300 that is configured to control driver assistance such as lane departure prevention.

Roadside object detection system 100 includes an external environment recognition unit 110, a driving condition variable sensing unit 120, and an arithmetic processing unit 130.

In the embodiments herein, external environment recognition unit 110 is a stereo camera configured to image an object simultaneously from different directions. However, external environment recognition unit 110 is not limited to a stereo camera and may be any device capable of capturing range images, such as a three-dimensional scanning laser radar.

The stereo camera used as external environment recognition unit 110 is an imaging means for capturing images ahead of vehicle 200 and has a pair of right and left cameras installed at positions separated from each other in the width direction of vehicle 200.

Driving condition variable sensing unit 120 includes sensors configured to measure driving condition variables of vehicle 200; in other words, configured to measure various types of information related to driving of vehicle 200.

Vehicle 200 includes, in driving condition variable sensing unit 120, sensors such as a vehicle speed sensor 121 configured to measure the travel speed of vehicle 200, a steering angle sensor 122 configured to measure a steering angle and a steering angular velocity in a steering system of vehicle 200, and an acceleration sensor 123 configured to measure longitudinal and lateral acceleration of vehicle 200.

Arithmetic processing unit 130 is a roadside object detection device configured to receive recognized external environment information (right/left captured image information) output from external environment recognition unit 110 and driving condition variable information of vehicle 200 output from driving condition variable sensing unit 120, and perform arithmetic processing on the received information to detect roadside objects.

Arithmetic processing unit 130 includes a microcomputer including an input circuit 131, a microprocessor unit (MPU) 132, a read only memory (ROM) 133, a random access memory (RAM) 134, and an output circuit 135. Input circuit 131 is configured to receive information from external environment recognition unit 110 and driving condition variable sensing unit 120. Output circuit 135 is configured to output roadside object detection information and the like to driver assistance control unit 300.

Arithmetic processing unit 130 performs processing for detecting roadside objects by executing a set of instructions described in a software program, and transmits a roadside object detection result to driver assistance control unit 300.

Hereinafter, the processing for detecting roadside objects performed by arithmetic processing unit 130 will be described in detail.

First Embodiment

Figure 2:
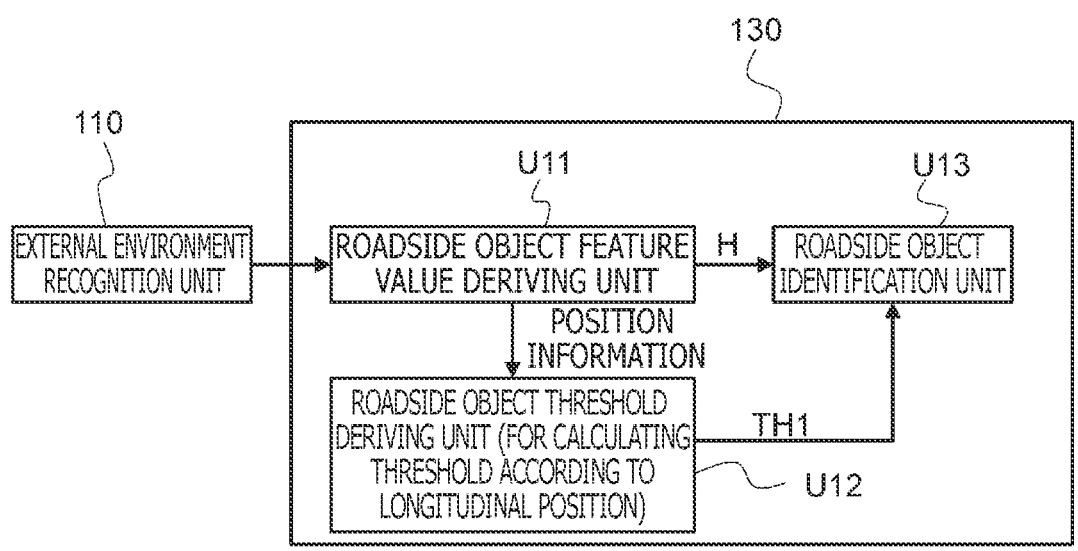
FIG. 2 is a functional block diagram for illustrating a first embodiment of processing for detecting roadside objects.

FIG. 2 is a functional block diagram for illustrating a first embodiment of the processing for detecting roadside objects performed by arithmetic processing unit 130.

As shown in FIG. 2, arithmetic processing unit 130 has software-based functions to serve as a roadside object feature value deriving unit U11, a roadside object threshold deriving unit U12, and a roadside object identification unit U13.

Based on the external environment information acquired by external environment recognition unit 110, roadside object feature value deriving unit U11 extracts roadside object candidates and determines information on the positional relationship between vehicle 200 (host vehicle) and each roadside object candidate (such position information will be referred to as "first feature value") and information on the height of the roadside object candidate above the road surface (such height information will be referred to as "second feature value").

Specifically, roadside object feature value deriving unit U11 performs calculation to generate a parallax image based on a left captured image and a right captured image provided by external environment recognition unit 110. In other words, roadside object feature value deriving unit U11 measures the distance from vehicle 200 to a target point based on parallax.

Then, roadside object feature value deriving unit U11 analyzes the parallax image and detects image coordinate pairs of one or more objects higher than the road surface by a predetermined value or more as indicating roadside object candidates, specifically, as curbstone candidates. Roadside object feature value deriving unit U11 uses these image coordinate pairs of the detected roadside object candidates as two-dimensional position information for locating the positions of the roadside object candidates relative to vehicle 200.

Then, roadside object threshold deriving unit U12 specifies a height threshold TH1 based on the position information determined by roadside object feature value deriving unit U11. Roadside object identification unit U13 compares the threshold TH1 and a height H of a detected roadside object candidate above the road surface corresponding to each image coordinate pair, and identifies, as indicating a roadside object, the image coordinate pair defining the height H exceeding the threshold TH1.

As an alternative, external environment recognition unit 110 may integrally include a camera computer configured to perform calculation to generate a parallax image, and arithmetic processing unit 130 may receive data of the parallax image from external environment recognition unit 110.

Here, roadside object threshold deriving unit U12 increases the threshold TH1 for an image coordinate pair of interest when it specifies a position far from vehicle 200 in the longitudinal (front-back) direction of vehicle 200 as compared to when it specifies a position near vehicle 200 in the direction.

That is, first, arithmetic processing unit 130 detects one or more roadside object candidates based on a common height reference. Then, for each roadside object candidate, arithmetic processing unit 130 specifies a height criterion for selection about whether the roadside object candidate is a roadside object or not in accordance with the distance of the roadside object candidate from vehicle 200.

In other words, for each roadside object candidate, arithmetic processing unit 130 specifies a height criterion for selection about whether the roadside object candidate is qualified as a roadside object or not, in accordance with the distance of the roadside object candidate from vehicle 200.

External environment recognition unit 110 captures images in front of vehicle 200 with high resolution. Thus, the roadside object candidate detection based on the parallax image is highly accurate in an area near external environment recognition unit 110. However, the pixel resolution of external environment recognition unit 110 decreases as the distance from external environment recognition unit 110 increases and thus, the accuracy of the roadside object candidate detection based on the parallax image decreases as the distance increases.

Figure 3:
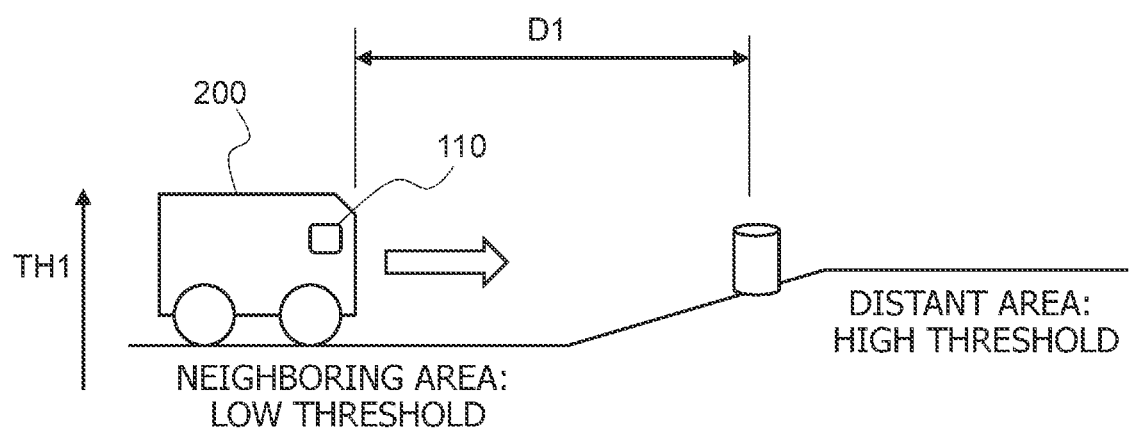
FIG. 3 is a schematic diagram for illustrating characteristics of a threshold TH1 in the first embodiment.

Accordingly, as shown in FIG. 3, arithmetic processing unit 130 increases the threshold TH1 for a roadside object candidate as a distance D1 (*m*) from vehicle 200 to the roadside object candidate increases. Thereby, arithmetic processing unit 130 prevents detecting a non-roadside object erroneously as a roadside object in an area far from vehicle 200, and reduces or prevents failure to detect a true roadside object in an area near vehicle 200.

In other words, arithmetic processing unit 130 reduces the probability of recognizing, as a roadside object, a roadside object candidate far from vehicle 200 in the longitudinal direction of vehicle 200 as compared to a roadside object candidate near vehicle 200 in the direction. Thereby, under favorable conditions in terms of sunshine and/or the like, arithmetic processing unit 130 measures the road curvature over long distances with high accuracy and detects roadside objects useful for proactive lane keeping. On the other hand, under unfavorable conditions in terms of sunshine and/or the like, arithmetic processing unit 130 reliably measures the road shape only over short distances and thus detects roadside objects useful for lane departure prevention.

Figure 4:
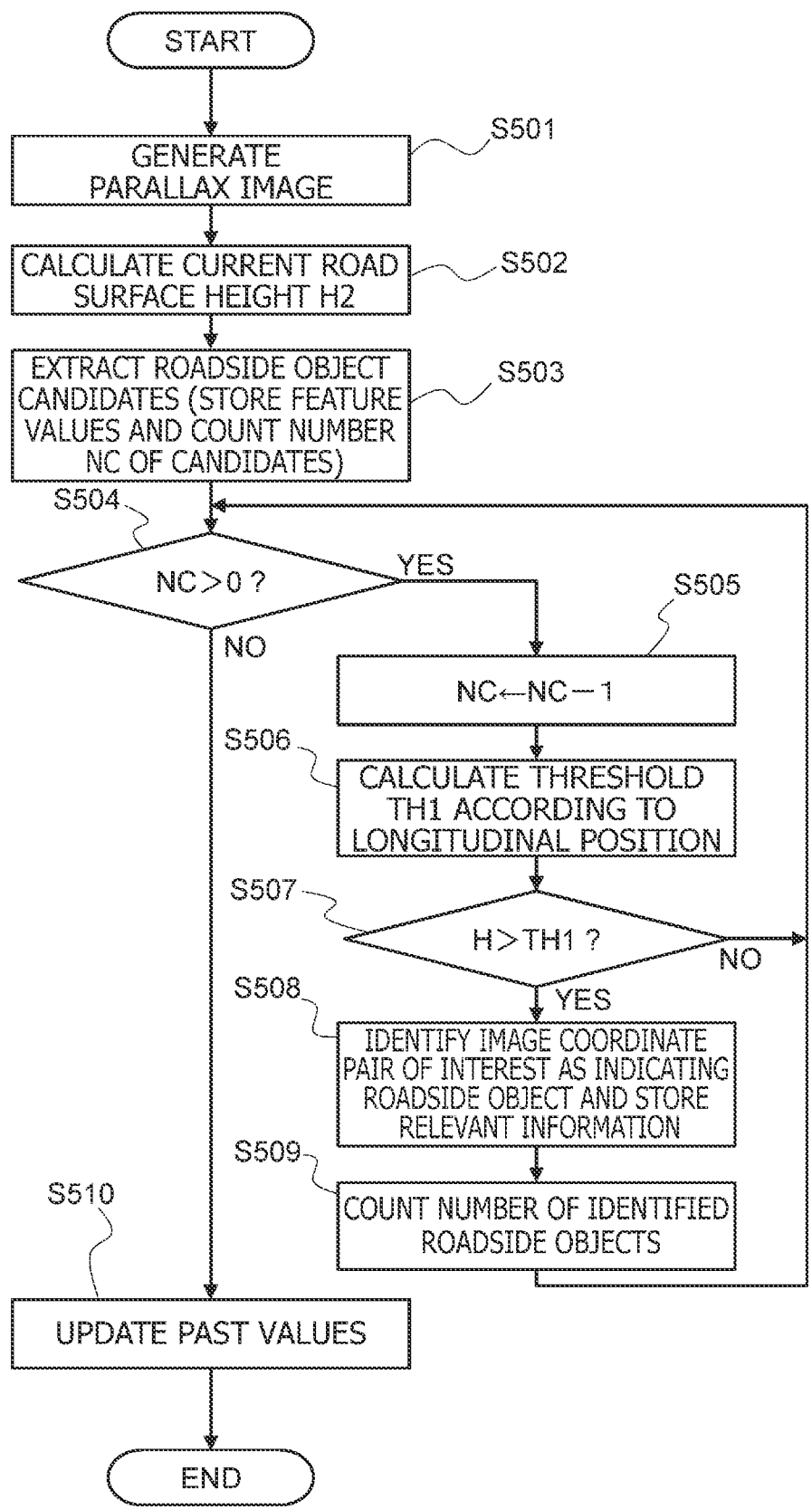
FIG. 4 is a flowchart illustrating the procedure of the processing for detecting roadside objects according to the first embodiment.

The flowchart of FIG. 4 illustrates the procedure of the processing for detecting roadside objects performed by arithmetic processing unit 130 in the first embodiment.

In step S501, arithmetic processing unit 130 generates a parallax image based on a left captured image and a right captured image provided by external environment recognition unit 110 (stereo camera).

Then, the operation proceeds to step S502, in which arithmetic processing unit 130 determines an average height of road surfaces on which vehicle 200 travels, based on the parallax image generated in step S501.

Specifically, arithmetic processing unit 130 divides the distance from vehicle 200 into regular segments (having a length of 5 m, for example), and calculates the median road surface height for each of areas corresponding to these individual distance segments as a road surface height H2 for the area in accordance with the distance of the area from vehicle 200.

The road surface height H2 is used as a height reference for roadside objects.

After determining the road surface height H2, the operation proceeds to step S503. In step S503, arithmetic processing unit 130 scans the parallax image to determine the relative heights H for the image coordinate pairs (i, j) of objects in the image in relation to the road surface. Specifically, the relative height for an image coordinate pair (i, j) of interest is calculated as a difference H (H=H1−H2) between the height H1 defined by the image coordinate pair (i, j) of interest and the road surface height H2 in the area including this image coordinate pair (i, j) of interest.

Then, arithmetic processing unit 130 extracts the image coordinate pairs (i, j) corresponding to the heights H equal to or higher than a predetermined value as indicating roadside object candidates. Arithmetic processing unit 130 stores data of the extracted image coordinate pairs (i, j) of the roadside object candidates as position information of the roadside object candidates, and stores data of the heights H calculated for the image coordinate pairs (i, j) as height information of the roadside object candidates. In addition, arithmetic processing unit 130 counts and stores the number NC of the image coordinate pairs (i, j) stored as indicating the roadside object candidates.

Then, the operation proceeds to step S504, in which arithmetic processing unit 130 determines whether the selection processing based on the comparison between the height H and the threshold TH1 has been completed for all the image coordinate pairs (i, j) extracted as indicating the roadside object candidates. The determination is based on whether the number NC is greater than zero.

As will be described later, each time the selection processing based on the comparison between the height H and the threshold TH1 has been completed for one of the extracted image coordinate pairs (i, j), arithmetic processing unit 130 subtracts one from the number NC. Based on the number NC after the subtraction, arithmetic processing unit 130 determines the number of image coordinate pairs (i, j) still left to be subjected to the selection processing.

That is, when the number NC after subtraction is zero, arithmetic processing unit 130 determines that the selection processing for all the image coordinate pairs (i, j) is completed. When the number NC is greater than zero, arithmetic processing unit 130 determines that there are still one or more image coordinate pairs (i, j) of roadside object candidates left to be subjected to the selection processing.

When the number NC is greater than zero, the operation proceeds to step S505, in which arithmetic processing unit 130 subtracts one from the number NC as a record indicating that one image coordinate pair (i, j) is subjected to the selection processing.

Then, the operation proceeds to step S506. In step S506, in accordance with the positional relationship between vehicle 200 and an image coordinate pair (i, j) indicating a roadside object candidate, arithmetic processing unit 130 specifies a height threshold TH1 for identifying the image coordinate pair (i, j) as indicating a roadside object; that is, a height-related threshold for identifying the roadside object candidate as a roadside object.

Specifically, arithmetic processing unit 130 specifies the threshold TH1 in accordance with the distance D1 from vehicle 200 to the position indicated by the image coordinate pair (i, j) of interest in the longitudinal direction of vehicle 200.

More specifically, arithmetic processing unit 130 converts the image coordinate pair (i, j) of interest into data of the distance D1, and specifies a threshold TH1 for use in selection processing for the image coordinate pair (i, j) of interest, based on the distance D1 resulting from the conversion.

Figure 5:
FIG. 5 is a graph illustrating the correlation between the threshold TH1 and a distance D1 according to the first embodiment.

FIG. 5 is a graph illustrating the correlation between the threshold TH1 and the distance D1, which is the first feature value.

As illustrated in FIG. 5, arithmetic processing unit 130 increases the threshold TH1 when the image coordinate pair (i, j) of interest specifies a position far from vehicle 200 as compared to when it specifies a position near vehicle 200.

The pixel resolution decreases as the distance from external environment recognition unit 110 increases, and thus, the accuracy of the roadside object candidate detection based on the parallax image decreases as the distance increases. Accordingly, as the distance from vehicle 200 to a roadside object candidate increases, arithmetic processing unit 130 increases the reference height for identifying the roadside object candidate as a roadside object. Thereby, arithmetic processing unit 130 prevents false-positive roadside object detection in an area far from external environment recognition unit 110, and prevents false-negative roadside object detection in an area near external environment recognition unit 110.

After arithmetic processing unit 130 specifies the threshold TH1, the operation proceeds to step S507. In step S507, arithmetic processing unit 130 compares the threshold TH1 with the height H determined for the image coordinate pair (i, j) of interest.

When the height H indicated by the image coordinate pair (i, j) of interest is greater than the threshold TH1, the operation proceeds to step S508. In step S508, arithmetic processing unit 130 determines that this image coordinate pair (i, j) of interest indicates a roadside object, and stores the position information and height information therefor in memory.

In other words, from among the roadside object candidates extracted based on a certain height criterion, arithmetic processing unit 130 selects which is qualified as roadside objects, based on the individual thresholds TH1 specified for the respective roadside object candidates in accordance with their positions in the vehicle longitudinal direction.

Then, in step S509, arithmetic processing unit 130 increases the count data of the number of image coordinate pairs (i, j) that are determined to indicate roadside objects.

After that, the operation returns to step S504, in which arithmetic processing unit 130 compares the number NC with zero to determine whether the selection processing has been completed for all the image coordinate pairs (i, j) extracted as the roadside object candidates.

When arithmetic processing unit 130 determines that the height H indicated by the image coordinate pair (i, j) of interest is equal to or less than the threshold TH1 in step S507, the operation skips steps S508 and S509 and returns to step S504. That is, when the height H indicated by the image coordinate pair (i, j) of interest is equal to or less than the threshold TH1, arithmetic processing unit 130 excludes the image coordinate pair (i, j) from the roadside object candidates so as to prevent the image coordinate pair (i, j) from being recognized as indicating a roadside object.

As described above, arithmetic processing unit 130 compares the height H indicated by the image coordinate pair (i, j) of interest and the threshold TH1 specified in accordance with the distance D1 from vehicle 200 to the position indicated by the image coordinate pair (i, j) in the longitudinal direction of vehicle 200 (the vehicle longitudinal position indicated by the image coordinate pair (i, j)), and determines that the image coordinate pair (i, j) of interest as indicating a roadside object when the height H exceeds the threshold TH1.

Then, when the selection processing for all the image coordinate pairs (i, j) is completed, and thus, arithmetic processing unit 130 determines that the number NC is zero in step S504, the operation proceeds from step S504 to step S510. In step S510, arithmetic processing unit 130 performs processing including updating the past values of the smoothing filter for use in the processing for detecting roadside objects. Then, the sequence of processing for detecting roadside objects ends.

In the processing for detecting roadside objects according to the first embodiment, when multiple curbstones having the same height H are lined up along the road edge line, roadside object detection system 100 may sometimes recognize the curbstones near vehicle 200 in the longitudinal direction of vehicle 200 as roadside objects but not recognize the curbstones far from vehicle 200 in the direction as roadside objects.

In other words, whether the individual curbstones of the same height H are recognized as roadside objects or not depends on their respective positions in the longitudinal direction of vehicle 200. This reflects varying the reference height for identifying an object as a roadside object in dependence on the vehicle longitudinal position of the object (the position of the object in the longitudinal direction of vehicle 200) in the processing for detecting roadside objects.

Second Embodiment

Figure 6:
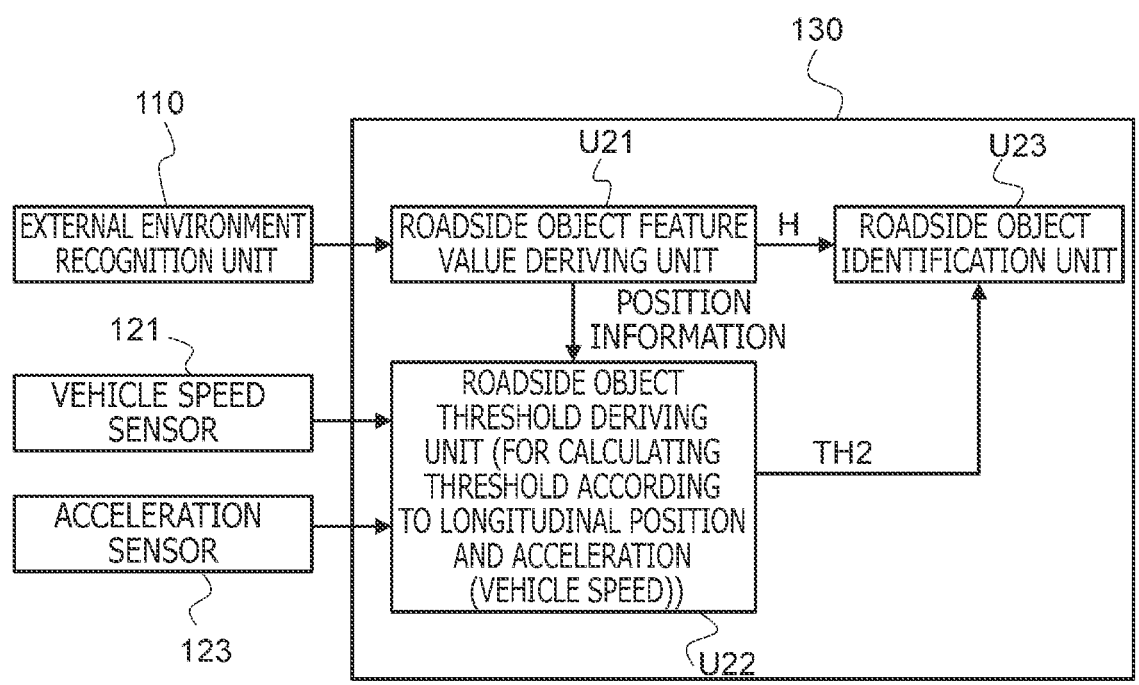
FIG. 6 is a functional block diagram for illustrating a second embodiment of the processing for detecting roadside objects.

FIG. 6 is a functional block diagram for illustrating a second embodiment of the processing for detecting roadside objects performed by arithmetic processing unit 130.

As shown in FIG. 6, arithmetic processing unit 130 has software-based functions to serve as a roadside object feature value deriving unit U21, a roadside object threshold deriving unit U22, and a roadside object identification unit U23, as in the first embodiment of FIG. 2.

Roadside object feature value deriving unit U21 and roadside object identification unit U23 have the same operations and functions as roadside object feature value deriving unit U11 and roadside object identification unit U13 of the first embodiment, respectively. Thus, detailed description thereof will be omitted.

As with roadside object threshold deriving unit U12 in the first embodiment, roadside object threshold deriving unit U22 specifies a higher threshold TH2 when a roadside object candidate is located far from vehicle 200 in the longitudinal direction of vehicle 200 than when it is located near vehicle 200 in the direction. In addition, roadside object threshold deriving unit U22 has a function of increasing the threshold TH2 when the speed or acceleration of vehicle 200 is high as compared to when the speed or acceleration is low.

In other words, roadside object threshold deriving unit U22 has a function of increasing the threshold TH2 when the behavior of vehicle 200 is large as compared to when the behavior of vehicle 200 is small.

Vehicle 200 has a greater pitch variation when the speed or acceleration of vehicle 200 is high than when it is low, and a greater pitch variation leads to blurring of images captured by external environment recognition unit 110. The blurring of the captured images reduces the reliability of roadside object detection based on the captured images.

Accordingly, roadside object threshold deriving unit U22 increases the threshold TH2 when the speed or acceleration of vehicle 200 is high as compared to when the speed or acceleration is low, assuming that the distance D1 from vehicle 200 to the roadside object candidate in the vehicle longitudinal direction is equal. This prevents false-positive roadside object detection due to blurring of captured images.

In other words, roadside object threshold deriving unit U22 reduces the probability of recognizing, as a roadside object, a roadside object candidate detected when the speed or acceleration of vehicle 200 is high as compared to a roadside object candidate detected when the speed or acceleration of vehicle 200 is low, even when the distances D1 from vehicle 200 to these roadside object candidates in the vehicle longitudinal direction are equal to each other. This allows for practically effective roadside object detection in driver assistance control such as lane departure prevention.

Figure 7:
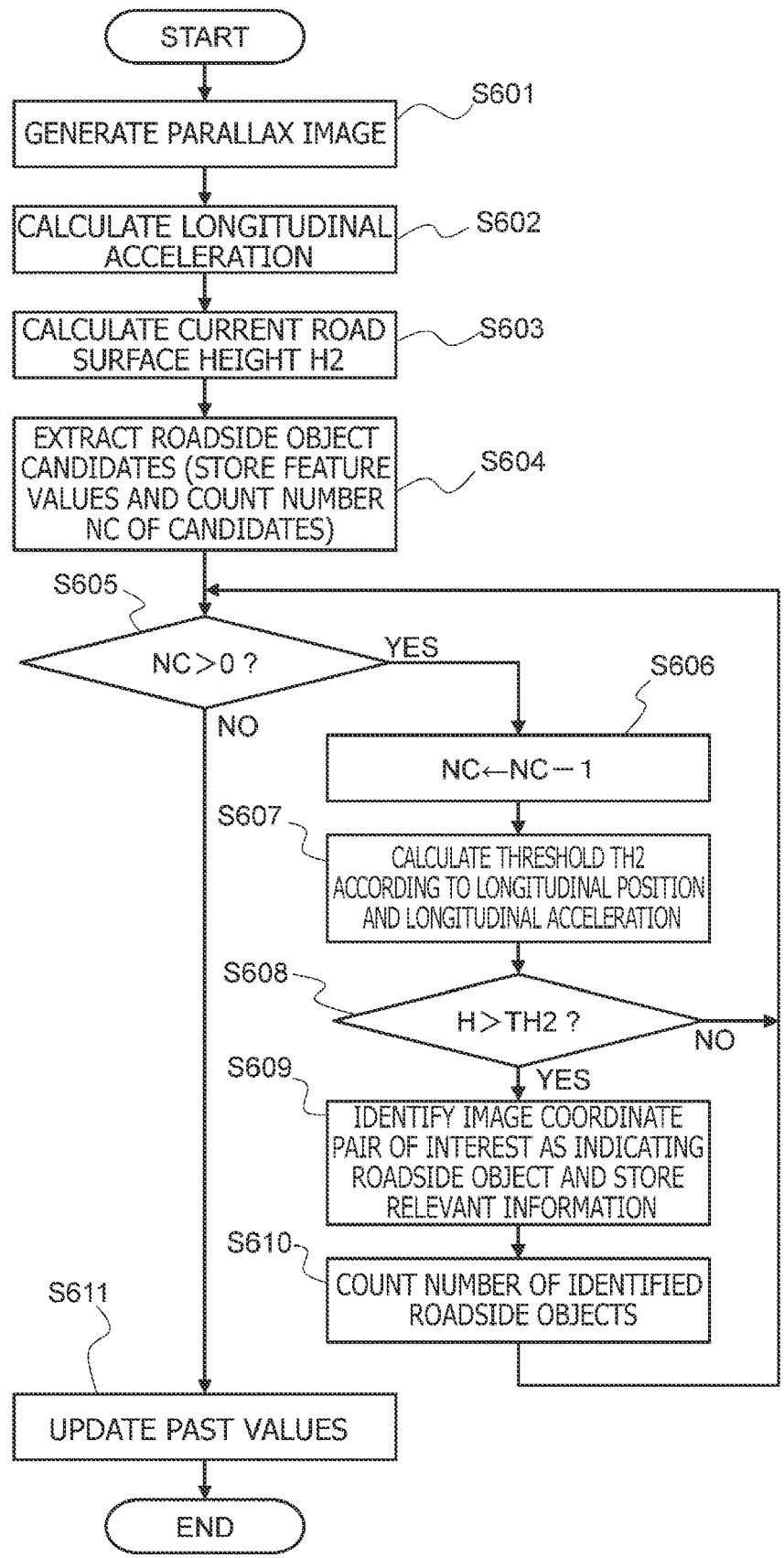
FIG. 7 is a flowchart illustrating the procedure of the processing for detecting roadside objects according to the second embodiment.

The flowchart of FIG. 7 illustrates the procedure of the processing for detecting roadside objects performed by arithmetic processing unit 130 in the second embodiment.

The processing for detecting roadside objects of the second embodiment differs from that of the first embodiment in the additional step S602 for retrieving a driving condition variable from driving condition variable sensing unit 120.

Furthermore, the processing for detecting roadside objects of the second embodiment differs from that of the first embodiment in that the threshold TH2 is specified in accordance with the positional relationship between vehicle 200 and an image coordinate pair (i, j) in the longitudinal direction of vehicle 200 and the speed or acceleration of vehicle 200 in step S607, and this threshold TH2 is used in comparison in step S608.

In other respects, the processing for detecting roadside objects of the second embodiment is the same as that of the first embodiment illustrated in the flowchart of FIG. 4.

That is, the processing details in steps S601, S603 to S606, and S609 to S611 in the flowchart of FIG. 7 are the same as those in steps S501 to S505 and S508 to S510 in FIG. 4. Thus, detailed description thereof will be omitted.

In step S602, arithmetic processing unit 130 retrieves the longitudinal acceleration of vehicle 200 measured by acceleration sensor 123 included in driving condition variable sensing unit 120.

Alternatively, instead of retrieving the longitudinal acceleration measured by acceleration sensor 123, arithmetic processing unit 130 may calculate an amount of change per unit time of the vehicle speed measured by vehicle speed sensor 121, and use the amount of change as the acceleration.

In step S607, arithmetic processing unit 130 specifies a higher threshold TH2*st* when the image coordinate pair (i, j) of interest specifies a position far from vehicle 200 than when it specifies a position near vehicle 200. Furthermore, arithmetic processing unit 130 specifies a correction coefficient Kac (Kac>1.0) for correcting the threshold TH2*st* in accordance with the longitudinal acceleration, and uses a product of the threshold TH2*st* and the correction coefficient Kac as the threshold TH2 (TH2←TH2*st*×Kac).

Figure 8A:
FIG. 8A is a graph illustrating the correlation between a threshold TH2$st$ and the distance D1 according to the second embodiment.
Figure 8B:
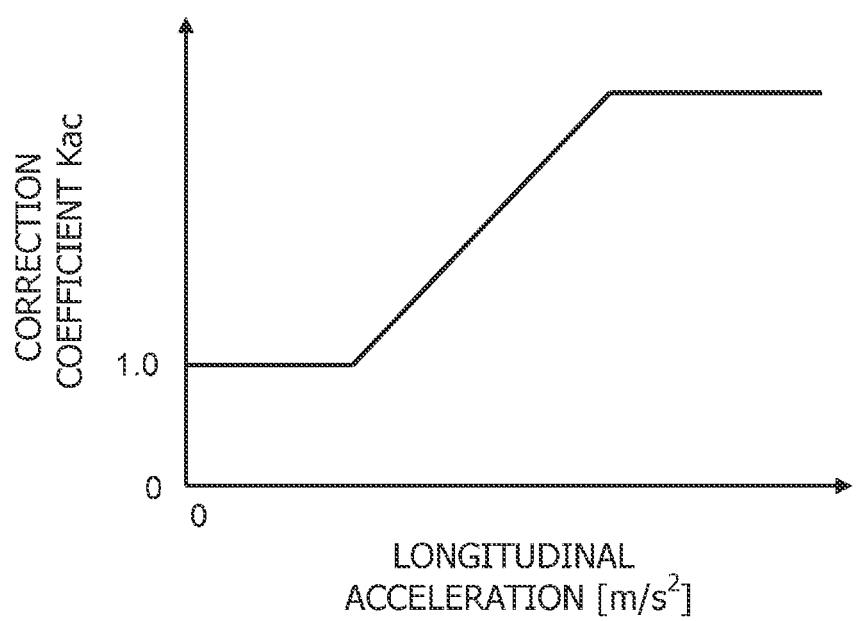
FIG. 8B is a graph illustrating the correlation between longitudinal acceleration and a correction coefficient Kac for correcting the threshold TH2$st$ according to the second embodiment.

FIG. 8A is a graph illustrating the correlation between the threshold TH2*st* and the distance D1 representing the vehicle longitudinal position specified by the image coordinate pair (i, j) of interest. FIG. 8B is a graph illustrating the correlation between the longitudinal acceleration of vehicle 200 and the correction coefficient Kac.

The correlation between the distance D1 and the threshold TH2*st* illustrated in FIG. 8A is the same as that of FIG. 5, which illustrates the characteristics of the threshold TH1 for use in specifying it according to the first embodiment.

As illustrated in FIG. 8B, at a low longitudinal acceleration (which refers to driving conditions including a constant speed), arithmetic processing unit 130 sets the correction coefficient Kac to 1.0 and uses the substantially uncorrected threshold TH2*st* as the threshold TH2. At a high longitudinal acceleration, arithmetic processing unit 130 sets the correction coefficient Kac to a value greater than 1.0 and uses the upward corrected TH2*st* as the threshold TH2.

That is, as the longitudinal acceleration of vehicle 200 increases, blurring of the captured image increases, and thus, the reliability of the extracted image coordinate pairs (i, j) as the roadside object candidates decreases. Accordingly, arithmetic processing unit 130 increases the threshold TH2 as the longitudinal acceleration increases, thereby reducing or preventing false-positive roadside object detection at a high longitudinal acceleration.

In the next step S608, arithmetic processing unit 130 compares the threshold TH2 with the height H indicated by the image coordinate pair (i, j) of interest. When the height H exceeds the threshold TH2, arithmetic processing unit 130 determines in step S609 that this image coordinate pair (i, j) indicates a roadside object, and stores the position information and height information therefor in memory.

As used herein, the "longitudinal acceleration" includes both positive acceleration and negative acceleration (deceleration). Arithmetic processing unit 130 changes the threshold TH2 to a higher value when vehicle 200 is suddenly accelerated and when vehicle 200 is suddenly decelerated.

In general, the pitch variation increases as the vehicle speed increases. Thus, arithmetic processing unit 130 may retrieve the vehicle speed measured by vehicle speed sensor 121 instead of retrieving the acceleration, and increase the threshold TH2 as the vehicle speed increases.

In other words, arithmetic processing unit 130 increases the threshold TH2 as the distance from vehicle 200 to the position indicated by the image coordinate pair (i, j) of interest increases, and increases the threshold TH2 as the vehicle speed or acceleration increases.

Note that the processing for specifying the threshold TH2 based on the longitudinal acceleration and the distance D1 in the vehicle longitudinal direction from vehicle 200 to the position indicated by the image coordinate pair (i, j) of interest is not limited to correcting the threshold TH2*st* based on the distance D1 with the correction coefficient Kac based on the longitudinal acceleration.

For example, arithmetic processing unit 130 may include a map or a function of variables representing the distance D1 and the longitudinal acceleration or the vehicle speed for determining the threshold TH2, and calculate the threshold TH2 using the map or function.

In the processing for detecting roadside objects according to the second embodiment, in some cases, a curbstone detected when vehicle 200 is in steady driving conditions, i.e., vehicle 200 is driven at a constant speed may be recognized as a roadside object, whereas a curbstone detected when vehicle 200 is being accelerated or decelerated and has an increased pitch variation may not be recognized as a roadside object even when these curbstones have the same height H and the same distance D1 from vehicle 200 in the vehicle longitudinal direction.

In other words, whether the individual curbstones of the same height H and the same distance D1 are recognized as roadside objects or not depends on the magnitude of pitch variation of vehicle 200 due to the acceleration and speed of vehicle 200. This reflects varying the reference height (threshold TH) for identifying a roadside object in dependence on the acceleration, speed or the magnitude of pitch variation of vehicle 200 in the processing for detecting roadside objects.

Third Embodiment

Figure 9:
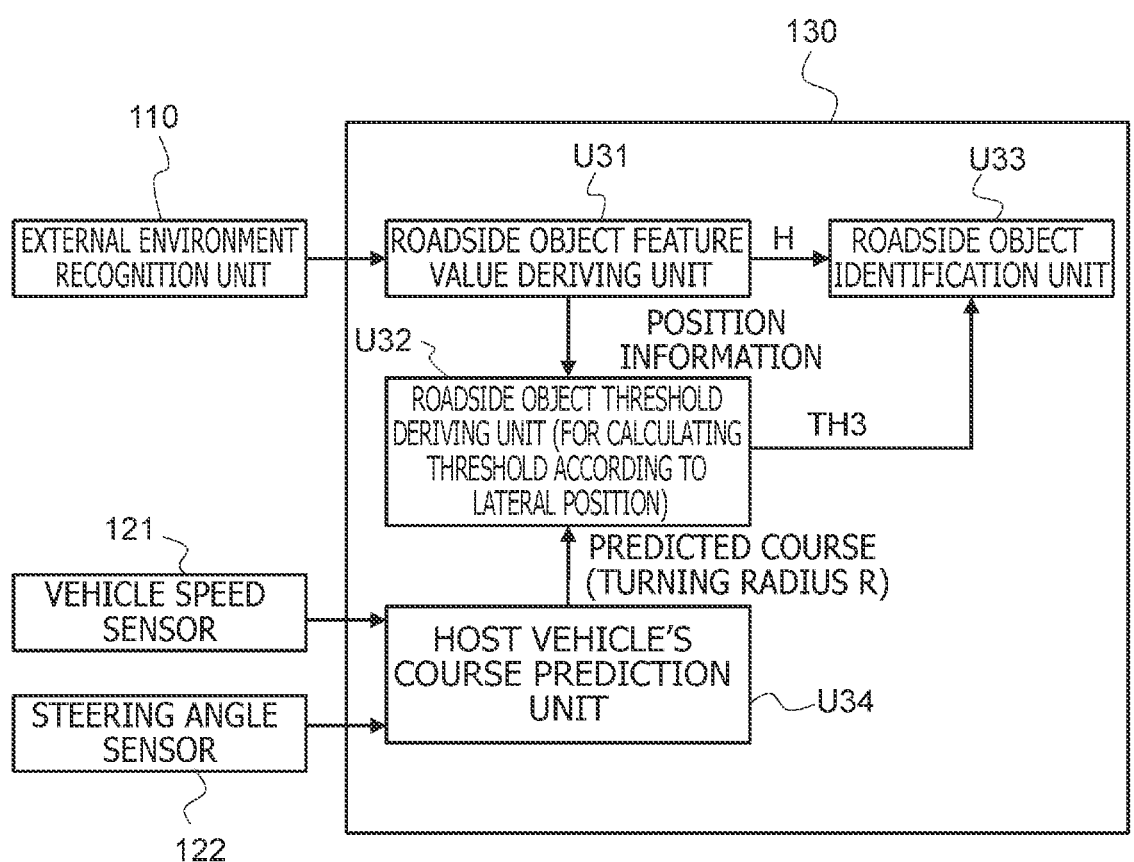
FIG. 9 is a functional block diagram for illustrating a third embodiment of the processing for detecting roadside objects.

FIG. 9 is a functional block diagram for illustrating a third embodiment of the processing for detecting roadside objects performed by arithmetic processing unit 130.

As shown in FIG. 9, arithmetic processing unit 130 has software-based functions to serve as a roadside object feature value deriving unit U31, a roadside object threshold deriving unit U32, a roadside object identification unit U33, and a host vehicle's course prediction unit U34.

Roadside object feature value deriving unit U31 and roadside object identification unit U33 have the same operations and functions as roadside object feature value deriving unit U11 and roadside object identification unit U13 of the first embodiment, respectively. Thus, detailed description thereof will be omitted.

Host vehicle's course prediction unit U34 predicts a course of vehicle 200 based on the driving condition variables of vehicle 200 measured by driving condition variable sensing unit 120.

Figure 10:
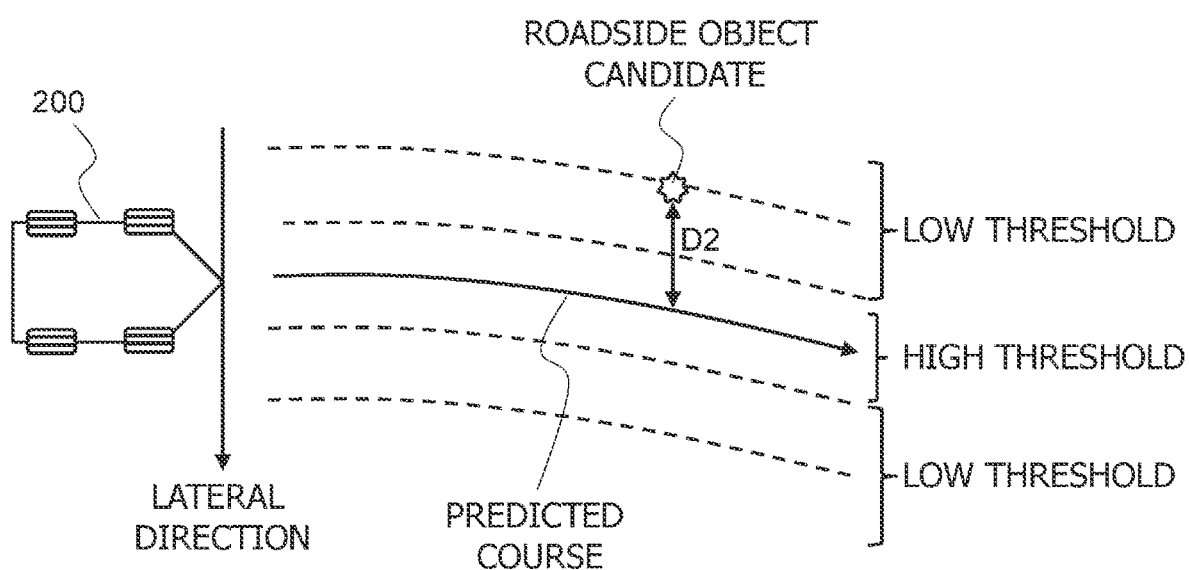
FIG. 10 is a schematic diagram for illustrating characteristics of a threshold TH3 in the third embodiment.

Roadside object threshold deriving unit U32 receives the predicted course determined by host vehicle's course prediction unit U34 and image coordinate pairs (i, j) of position information of roadside object candidates determined by roadside object feature value deriving unit U31. Based on these, roadside object threshold deriving unit U32 specifies a lower threshold TH3 for an image coordinate pair (i, j) of interest when it specifies a position far from the predicted course in the lateral (right-left) direction of vehicle 200 than when it specifies a position near the predicted course in the direction, as shown in FIG. 10.

If false-positive roadside object detection occurs straight ahead in the course of vehicle 200, the driver assistance system will erroneously perform braking processing, for example. On the other hand, if detection failure of true roadside objects lying laterally away from the straight-ahead direction in the course of vehicle 200 occurs, driver assistance such as lane departure prevention will fail to function properly.

Accordingly, to reduce or prevent erroneous braking due to false-positive roadside object detection, roadside object threshold deriving unit U32 specifies a higher threshold TH3 for a roadside object candidate lying straight ahead in course of vehicle 200 than for a roadside object candidate lying beside the course of vehicle 200.

Figure 11:
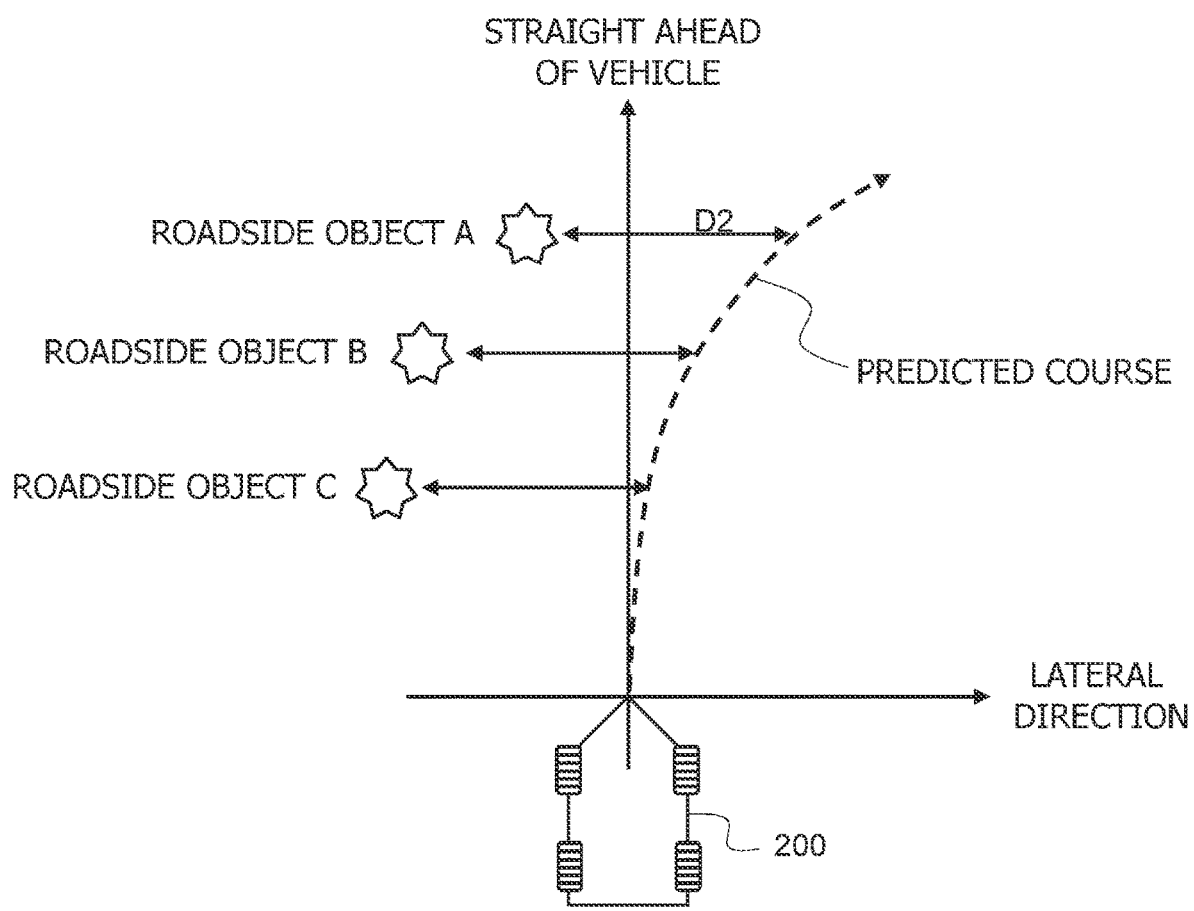
FIG. 11 is a schematic diagram for illustrating why a predicted course is used in the third embodiment.

Note that if roadside object threshold deriving unit U32 specifies a higher threshold TH3 for a roadside object candidate nearly or substantially straight ahead in the current forward direction of vehicle 200 than for a roadside object candidate away from straight ahead in the direction without referring to the predicted course, roadside objects such as roadside object A in FIG. 11 may be erroneously ignored as noise, for example.

Specifically, roadside objects A to C shown in FIG. 11 have substantially the same height and lie laterally away from the predicted course by substantially the same distance as each other. However, based on the current front of vehicle 200, roadside object A may be regarded as being most nearly straight ahead of vehicle 200.

Thus, if a higher threshold TH3 is specified for a roadside object candidate nearly or substantially straight ahead in the current forward direction of vehicle 200 than for a roadside object candidate away from straight ahead in the direction, the height H of roadside object A may fall below its threshold TH3 and roadside object A may fail to be detected as a roadside object.

Accordingly, roadside object threshold deriving unit U32 specifies a higher threshold TH3 for an image coordinate pair (i, j) that specifies a position near the predicted course in the lateral direction of vehicle 200 than for an image coordinate pair (i, j) that specifies a position far from the predicted course in the direction so as to reduce the probability of recognizing, as a roadside object, a roadside object candidate near the predicted course.

Thereby, roadside object threshold deriving unit U32 prevents erroneous braking due to false-positive roadside object detection in the center of the driving course of vehicle 200, and reduces or prevents failure to generate a steering control command such as for lane departure prevention.

In the example of FIG. 11, roadside objects A to C lie away from the predicted course by substantially the same distance D2 in the lateral direction of vehicle 200. Accordingly, when roadside objects A to C are detected as roadside object candidates, roadside object threshold deriving unit U32 specifies the thresholds TH3 of the same level for the respective roadside objects A to C. Thus, failing to detect roadside object A can be prevented.

Here, the advantages and effects of the third embodiment will be described with reference to FIG. 12.

Figure 12:
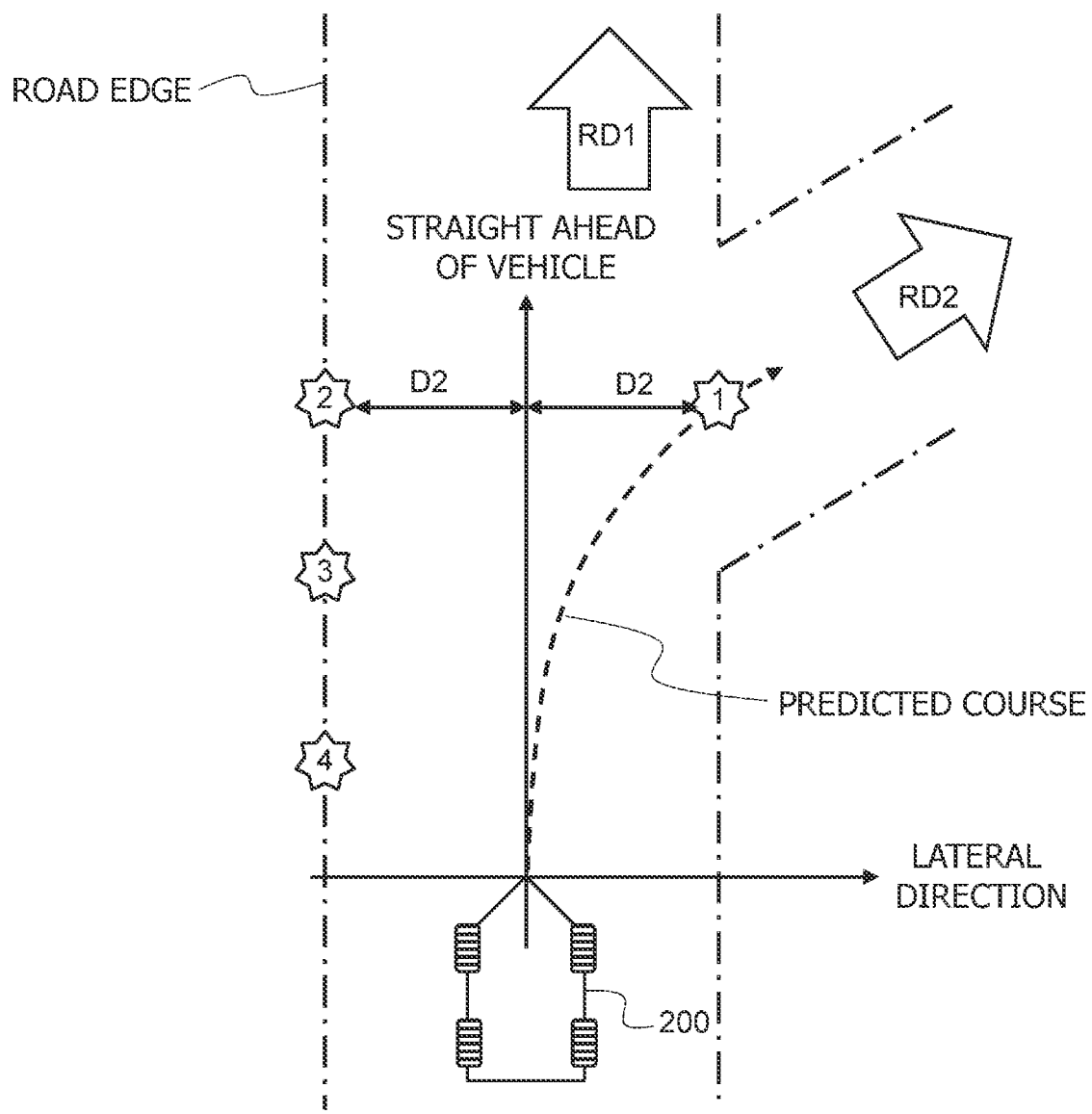
FIG. 12 is a schematic diagram for illustrating the advantages and effects of the third embodiment.

In the example of FIG. 12, obstacles 2 to 4, each having a sufficient height as a roadside object, are located on a virtual left edge line of road RD1 that extends straight ahead of vehicle 200, and obstacle 1 having a height that requires no driver assistance control intervention is located in branch road RD2 that branches diagonally forward right from road RD1.

More specifically, obstacle 1 is located such that the distance of obstacle 1 from straight ahead in the current forward direction of vehicle 200 is substantially equal to the distance of obstacles 2 to 4 from straight ahead in the current forward direction of vehicle 200. In other words, obstacle 1 is located on a virtual right edge line of road RD1 that could have been drawn if branch road RD2 did not exist.

Assume here that, under such conditions, obstacle 1 is detected as a target of driver assistance control intervention. In this case, even if the driver performs a steering operation to advance vehicle 200 toward branch road RD2, vehicle 200 will be prevented from entering branch road RD2 by steering control and/or the like.

In contrast, in the third embodiment, the height threshold TH3 for identifying a roadside object candidate as a roadside object is specified in accordance with the distance D2 in the lateral direction of vehicle 200 between the roadside object candidate and the predicted course. Thus, according to the third embodiment, since obstacle 1 is located near the predicted course, the threshold TH3 specified for obstacle 1 is higher than it would be if obstacle 1 were far from the predicted course. As a result, obstacle 1 is ignored as noise, so that obstacle 1 is prevented from being identified as a roadside object, i.e., as a control intervention target.

Thus, when obstacle 1 that does not interfere with traffic is on the road ahead, vehicle 200 is less likely to be subjected to unnecessary steering control based on obstacle 1, and thus, can be driven to branch road RD2 without malfunction.

Figure 13:
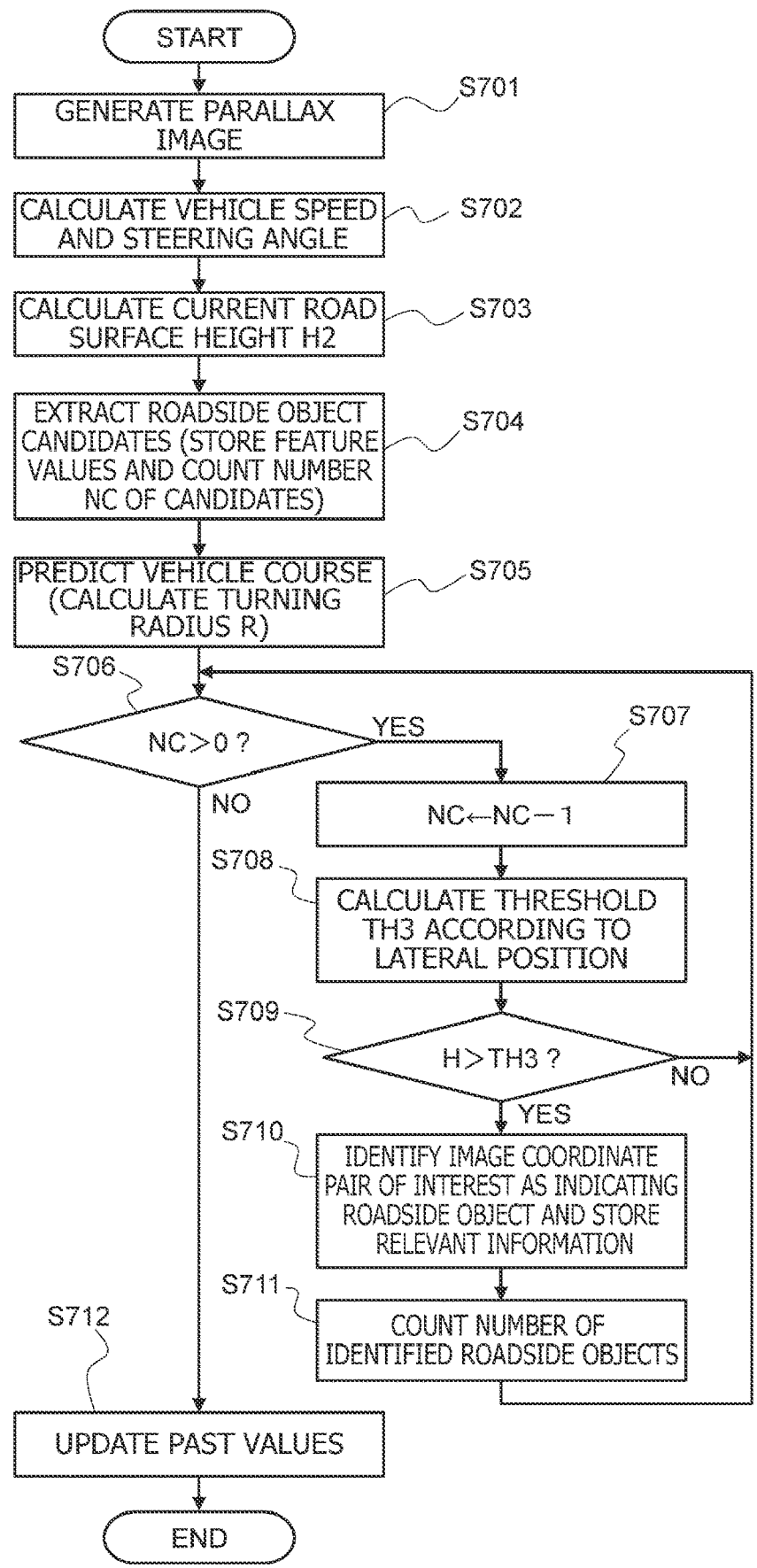
FIG. 13 is a flowchart illustrating the procedure of the processing for detecting roadside objects according to the third embodiment.

The flowchart of FIG. 13 illustrates the procedure of the processing for detecting roadside objects performed by arithmetic processing unit 130 in the third embodiment.

In the processing for detecting roadside objects of the third embodiment, step S705 for course prediction is added to the flowchart of FIG. 7 illustrating the processing for detecting roadside objects of the second embodiment. Furthermore, the details of processing for calculating driving condition variables in step S702, the details of processing for calculating the threshold TH3 in step S708, and the threshold TH used in step S709 in the flowchart of FIG. 13 are different from those of the corresponding steps in the second embodiment.

However, the processing details in steps other than the above in the flowchart of FIG. 13 are the same as those in the corresponding steps of the second embodiment illustrated in the flowchart of FIG. 7.

That is, the processing details in steps S701, S703, S704, S706, S707, and S710 to S712 in the flowchart of FIG. 13 are the same as those in steps S601, S603, S604, S605, S606, and S609 to S611 in FIG. 7. Thus, detailed description thereof will be omitted.

Arithmetic processing unit 130 retrieves the steering angle S, the vehicle speed V, and the like as driving condition variables in step S702, and predicts a course of vehicle 200 based on the steering angle S, the vehicle speed V, and the like in step S705.

Assume here that the position of vehicle 200 is at the origin. Then, the predicted course of vehicle 200 can be approximated by a circular arc formed by a turning radius R centered at the origin. Thus, in step S705, based on the steering angle S, the vehicle speed V, the stability factor A, and the wheel base L, arithmetic processing unit 130 calculates the turning radius R ($R=(1+A \times V^2) \times (L/S)$), which represents the predicted course.

Then, in step S708, arithmetic processing unit 130 specifies a threshold TH3 for an image coordinate pair (i, j) of interest in accordance with the positional relationship in the lateral direction of vehicle 200 between the predicted course and the image coordinate pair (i, j); that is, in accordance with the distance from the predicted course to the position specified by the image coordinate pair (i, j) in the lateral direction of vehicle 200.

Figure 14:
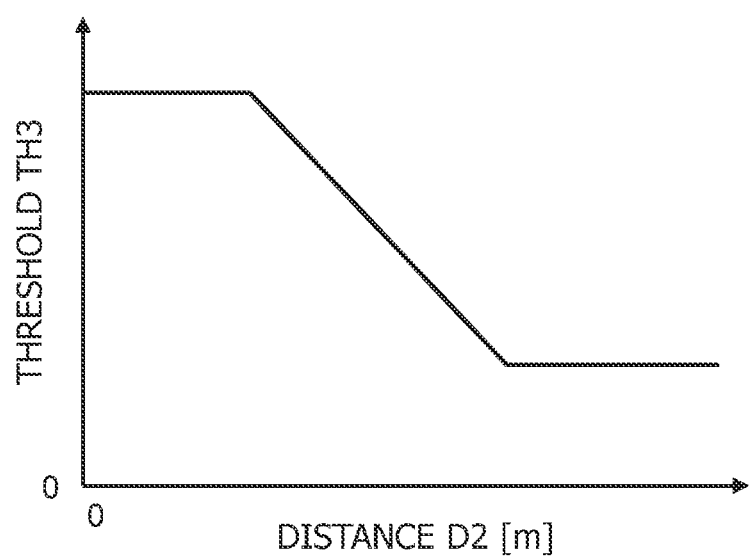
FIG. 14 is a graph illustrating the correlation between the threshold TH3 and a distance D2 according to the third embodiment.

FIG. 14 illustrates the correlation between the threshold TH3 and the distance D2 (see FIG. 10) in the lateral direction of vehicle 200 from the predicted course to the position specified by an image coordinate pair (i, j).

As illustrated in FIG. 14, arithmetic processing unit 130 decreases the threshold TH3 as the distance D2 increases, i.e., specifies a lower threshold TH3 when an image coordinate pair (i, j) of interest specifies a position far from the predicted course than when it specifies a position near the predicted course.

In other words, arithmetic processing unit 130 specifies a higher threshold TH3 for an image coordinate pair (i, j) indicating a position near the center of the driving course of vehicle 200, and specifies a lower threshold TH3 for an image coordinate pair (i, j) indicating a position laterally away from the center of the driving course of vehicle 200. Thereby, arithmetic processing unit 130 reduces the probability of recognizing, as a roadside object, a roadside object candidate lying near the center of the driving course of vehicle 200.

In the next step S709, arithmetic processing unit 130 compares the threshold TH3 with the height H indicated by an image coordinate pair (i, j) of interest. When the height H exceeds the threshold TH3, arithmetic processing unit 130 identifies, in step S710, this image coordinate pair (i, j) as indicating a roadside object, and stores the position information and height information therefor in memory.

According to the third embodiment, it is possible to prevent false-positive roadside object detection in the center of the driving course of vehicle 200, where roadside object detection is likely to trigger braking control, and also possible to prevent false-negative roadside object detection by the sides of the driving course of vehicle 200, thereby preventing failure to generate a steering control command.

In the processing for detecting roadside objects according to the third embodiment, when obstacles having the same height H are lined up in the lateral direction of vehicle 200, roadside object detection system 100 may sometimes recognize an obstacle far from the predicted course of vehicle 200 as a roadside object but not recognize an obstacle near the predicted course of vehicle 200 as a roadside object.

In other words, whether the individual obstacles of substantially the same height H are recognized as roadside objects or not depends on their respective positions relative to the predicted course in the lateral direction of vehicle 200. This reflects varying the reference height for identifying an object as a roadside object in dependence on the distance D2 of the object from the predicted course in the processing for detecting roadside objects.

Fourth Embodiment

Figure 15:
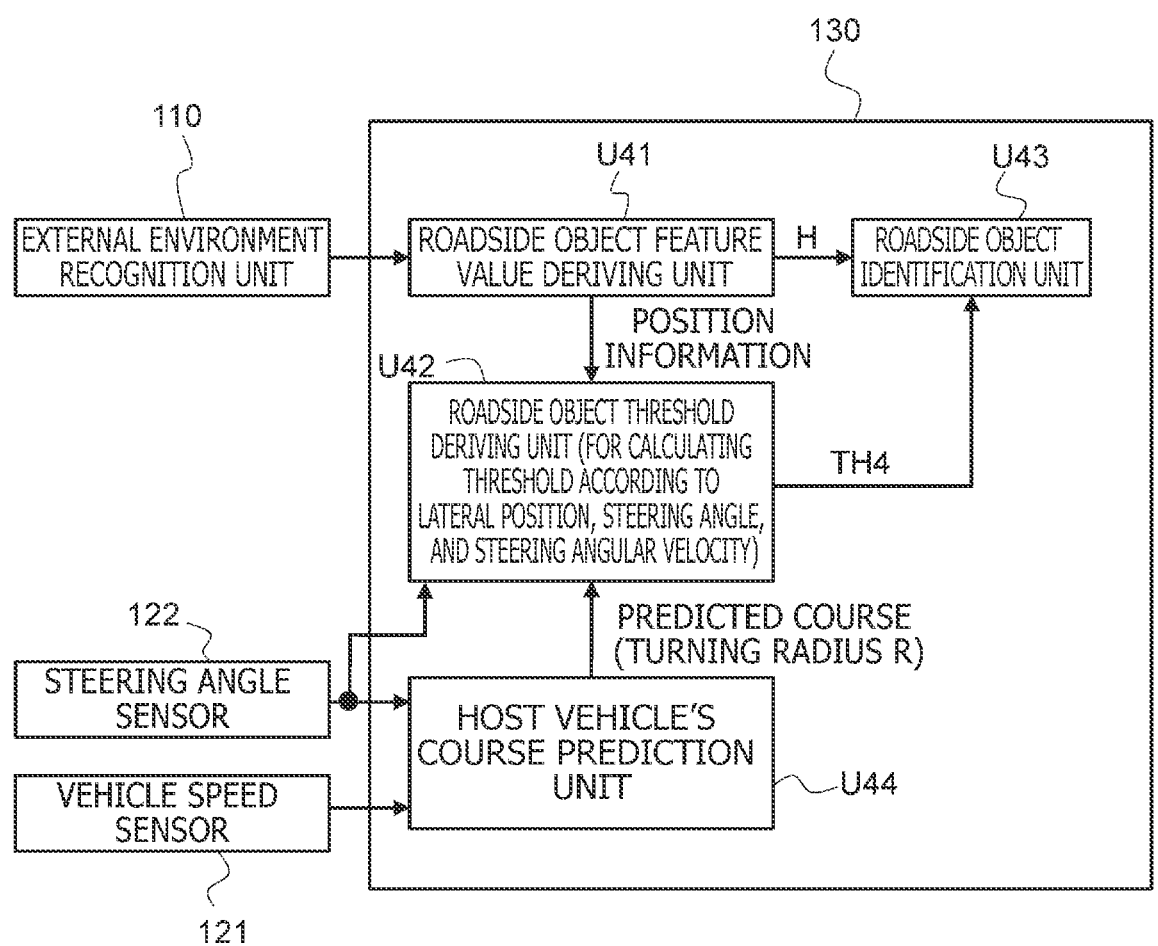
FIG. 15 is a functional block diagram for illustrating a fourth embodiment of the processing for detecting roadside objects.

FIG. 15 is a functional block diagram for illustrating a fourth embodiment of the processing for detecting roadside objects performed by arithmetic processing unit 130.

As shown in FIG. 15, arithmetic processing unit 130 has software-based functions to serve as a roadside object feature value deriving unit U41, a roadside object threshold deriving unit U42, a roadside object identification unit U43, and a host vehicle's course prediction unit U44, as in the third embodiment.

Unlike roadside object threshold deriving unit U32 of the third embodiment, roadside object threshold deriving unit U42 specifies a threshold TH4 for an image coordinate pair (i, j) based on the steering angle, the steering angular velocity, and the distance D2 from the predicted course to the position indicated by the image coordinate pair (i, j) in the lateral direction of vehicle 200.

As described above, blurring of images captured by external environment recognition unit 110 is caused by pitch variation due to longitudinal acceleration of vehicle 200, as well as by other behaviors of vehicle 200, such as yaw angle variation and roll angle variation.

The blurring of the captured image increases when the behaviors of vehicle 200 such as yaw angle variation and roll angle variation are large as compared to when the behaviors are small, and increased blurring of the captured image reduces the reliability of the processing for detecting roadside object candidates.

Accordingly, roadside object threshold deriving unit U42 specifies the threshold TH4 which varies in accordance with the distance D2 as in the third embodiment, and, furthermore, which increases when the behaviors of vehicle 200 as indicated by yaw angle variation and roll angle variation are large as compared to when the behaviors of vehicle 200 are small.

Thus, according to the fourth embodiment, in addition to providing the effects of the third embodiment, it is also possible to prevent false-positive roadside object detection when yaw angle variation and roll angle variation of vehicle 200 are large.

Figure 16:
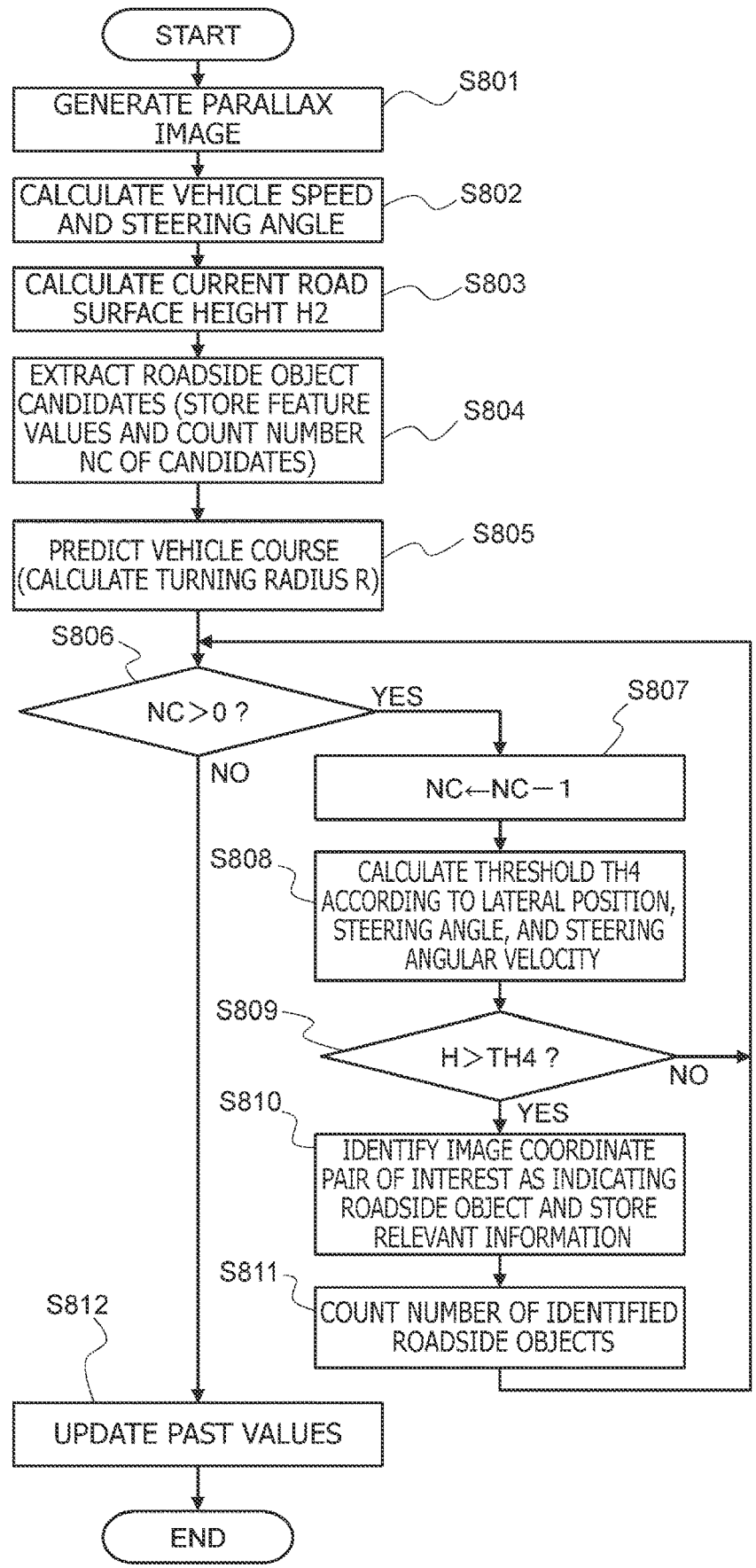
FIG. 16 is a flowchart illustrating the procedure of the processing for detecting roadside objects according to the fourth embodiment.

The flowchart of FIG. 16 illustrates the procedure of the processing for detecting roadside objects performed by arithmetic processing unit 130 in the fourth embodiment.

The processing for specifying the threshold TH4 in step S808 in the processing for detecting roadside objects of the fourth embodiment differs from the corresponding processing in the flowchart of FIG. 13 illustrating the processing for detecting roadside objects of the third embodiment.

However, the processing details in the other steps S801 to S807 and S809 to S812 are the same as those in steps S701 to S707 and S709 to S712 in FIG. 13. Thus, detailed description thereof will be omitted.

In step S808, arithmetic processing unit 130 specifies a threshold TH4*st* for an image coordinate pair (i, j) in accordance with the positional relationship in the lateral direction of vehicle 200 between the predicted course and the image coordinate pair (i, j).

Figure 17A:
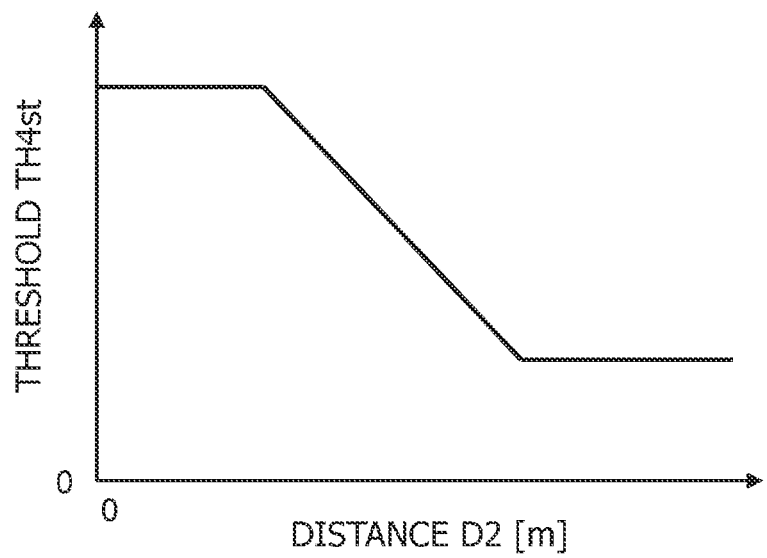
FIG. 17A is a graph illustrating the correlation between a threshold TH4$st$ and the distance D2 according to the fourth embodiment.

As illustrated in FIG. 17A, arithmetic processing unit 130 decreases the threshold TH4$st$ as the distance D2 increases, i.e., specifies a lower threshold TH4$st$ for an image coordinate pair (i, j) when it specifies a position far from the predicted course in the lateral direction of vehicle 200 than when it specifies a position near the predicted course in the direction.

The above characteristics of the threshold TH4$st$ for use in specifying it is the same as those of the threshold TH3 of the third embodiment.

Furthermore, in step S808, arithmetic processing unit 130 specifies a correction coefficient Kyr for correcting the threshold TH4$st$ in accordance with the steering angle and steering angular velocity, and uses a product of the threshold TH4$st$ and the correction coefficient Kyr as the threshold TH4 (TH4←TH4$st$×Kyr).

Figure 17B:
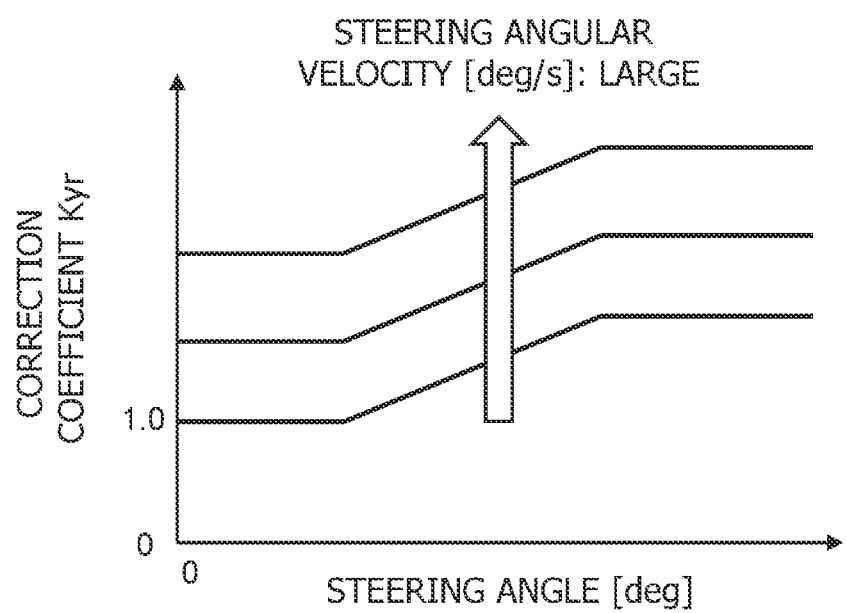
FIG. 17B is a graph illustrating the correlation between steering angle/steering angular velocity and a correction coefficient Kyr for correcting the threshold TH4$st$ according to the fourth embodiment.

FIG. 17B is a graph illustrating the correlation between the correction coefficient Kyr (Kyr>1.0) and the steering angle and steering angular velocity of vehicle 200.

As shown in FIG. 17B, arithmetic processing unit 130 sets the correction coefficient Kyr to a greater value as the steering angle is greater and as the steering angular velocity is greater.

Here, the yaw angle variation increases as the steering angle increases, and the roll angle variation increases as the steering angular speed increases. Thus, arithmetic processing unit 130 increases the correction coefficient Kyr to a greater value as the yaw angle variation of vehicle 200 increases and as the roll angle variation of vehicle 200 increases.

In other words, arithmetic processing unit 130 estimates the yaw angle variation based on the steering angle, and estimates the roll angle variation based on the steering angular velocity, and sets the correction coefficient Kyr to a higher value and thereby increases the threshold TH4 when the behaviors of vehicle 200 as indicated by yaw angle variation and roll angle variation are large as compared to when the behaviors of vehicle 200 are small.

As an alternative, arithmetic processing unit 130 may include a map or a function of variables representing the distance D2, the steering angle, and the steering angular velocity for determining the threshold TH4, and calculate the threshold TH4 using the map or function.

As yet another alternative, arithmetic processing unit 130 may vary the threshold TH4 in accordance with any one of the steering angle and the steering angular velocity.

In the next step S809, arithmetic processing unit 130 compares the threshold TH4 with the height H indicated by the image coordinate pair (i, j) of interest. When the height H exceeds the threshold TH4, arithmetic processing unit 130 identifies, in step S810, this image coordinate pair (i, j) as indicating a roadside object, and stores the position information and height information therefor in memory.

According to the fourth embodiment, it is possible to prevent false-positive roadside object detection in the center of the driving course of vehicle 200, where roadside object detection is likely to trigger braking control, it is also possible to prevent false-negative roadside object detection by the sides of the driving course of vehicle 200, thereby preventing failure to generate a steering control command, and it is also possible to reduce or prevent false-positive roadside object detection when captured images are very blurry due to large yaw angle variation and/or large roll angle variation of vehicle 200.

In the processing for detecting roadside objects according to the fourth embodiment, in some cases, roadside object detection system 100 may recognize, as a roadside object, an obstacle detected when yaw angle variation and/or roll angle variation of vehicle 200 are small but not recognize, as a roadside object, an obstacle detected when yaw angle variation and/or roll angle variation of vehicle 200 are large even when these obstacles have the same height H and lie the same distance away from the predicted course.

In other words, whether the individual obstacles of the same height H and lying the same distance away from the predicted course are recognized as roadside objects or not depends on the magnitude of the yaw angle variation and/or roll angle variation of vehicle 200. This reflects varying the reference height for identifying a roadside object in dependence on the magnitude of the yaw angle variation and/or roll angle variation in the processing for detecting roadside objects.

Fifth Embodiment

Figure 18:
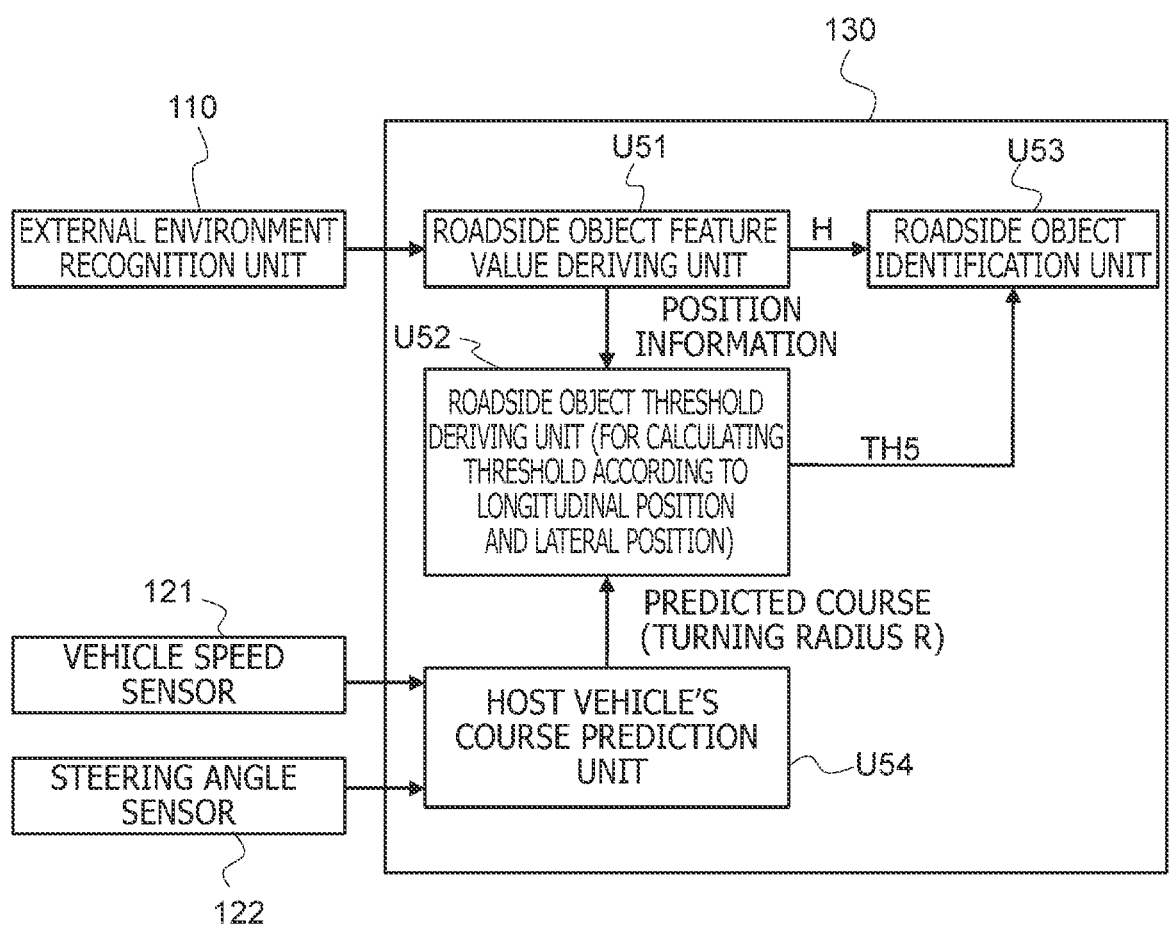
FIG. 18 is a functional block diagram for illustrating a fifth embodiment of the processing for detecting roadside objects.

FIG. 18 is a functional block diagram for illustrating a fifth embodiment of the processing for detecting roadside objects performed by arithmetic processing unit 130.

As shown in FIG. 18, arithmetic processing unit 130 has software-based functions to serve as a roadside object feature value deriving unit U51, a roadside object threshold deriving unit U52, a roadside object identification unit U53, and a host vehicle's course prediction unit U54.

As in the third embodiment, arithmetic processing unit 130 includes functions to serve as the roadside object feature value deriving unit U51, the roadside object threshold deriving unit U52, the roadside object identification unit U53, and the host vehicle's course prediction unit U54. However, the details of processing performed by roadside object threshold deriving unit U52 differ from those of the corresponding processing of the third embodiment.

Specifically, like roadside object threshold deriving unit U12 of the first embodiment, roadside object threshold deriving unit U52 increases the threshold TH5 for an image coordinate pair of interest when it specifies a position far from vehicle 200 in the longitudinal direction of vehicle 200 as compared to when it specifies a position near vehicle 200 in the direction. Furthermore, roadside object threshold deriving unit U32 of the third embodiment, roadside object threshold deriving unit U52 increases the threshold TH5 for the image coordinate pair (i, j) of interest when the position specified by the image coordinate pair (i, j) is far from the predicted course in the lateral direction of vehicle 200 as compared to when it is near the predicted course in the direction.

Thus, according to the fifth embodiment, it is possible to prevent detecting a non-roadside object erroneously as a roadside object in an area far from vehicle 200 in the longitudinal direction of vehicle 200, and also possible to reduce or prevent failure to detect a true roadside object in an area near vehicle 200 in the longitudinal direction.

Furthermore, it is possible to prevent erroneous braking due to false-positive roadside object detection in the center of the driving course of vehicle 200, and also possible to reduce or prevent failure to generate a steering control command such as for lane departure prevention.

Figure 19:
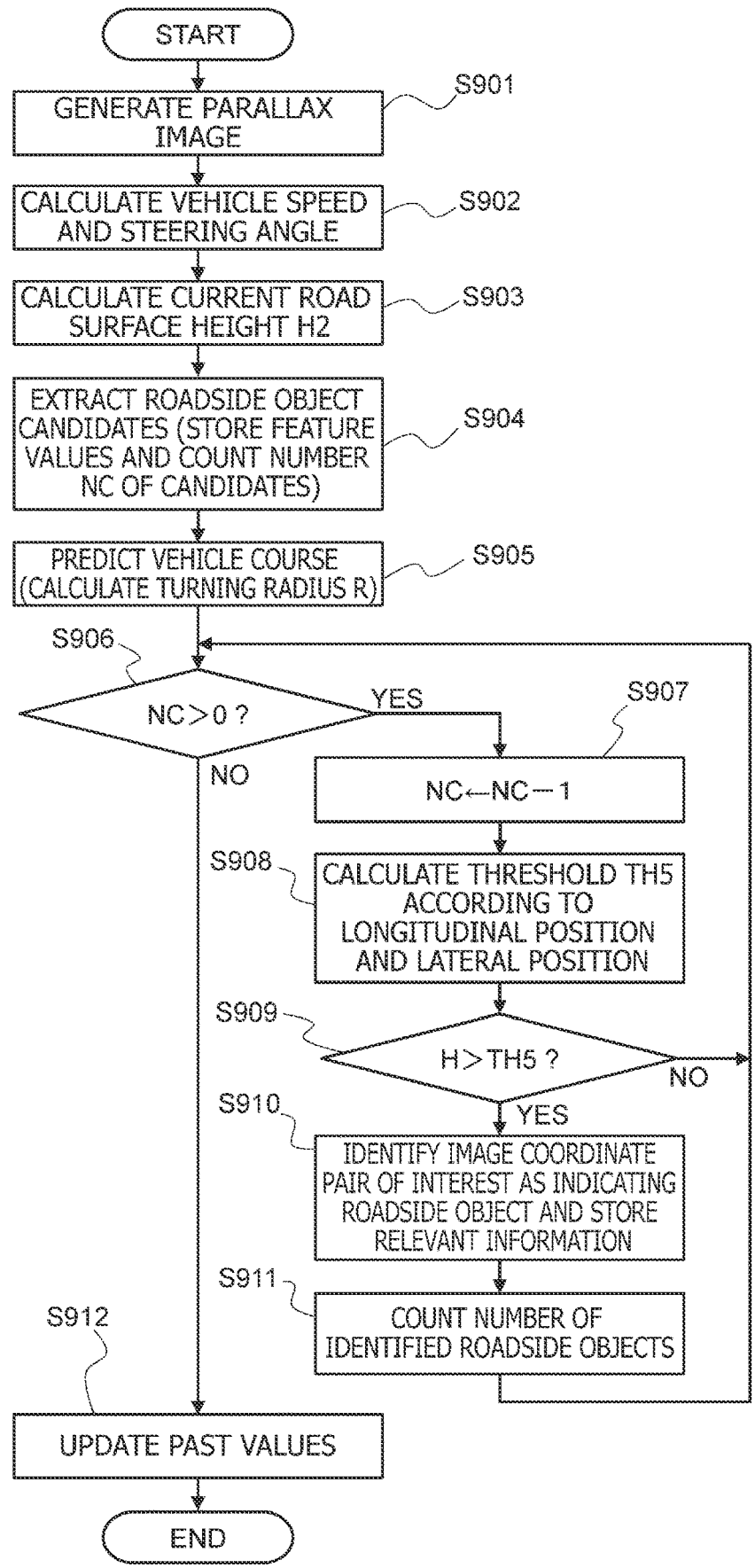
FIG. 19 is a flowchart illustrating the procedure of the processing for detecting roadside objects according to the fifth embodiment.

The flowchart of FIG. 19 illustrates the procedure of the processing for detecting roadside objects performed by arithmetic processing unit 130 in the fifth embodiment.

The processing for specifying the threshold TH5 in step S908 in the processing for detecting roadside objects of the fifth embodiment differs from the corresponding processing in the flowchart of FIG. 16 illustrating the processing for detecting roadside objects of the fourth embodiment. However, the processing details in the other steps S901 to S907 and S909 to S912 are the same as those in steps S801 to S807 and S809 to S812 in FIG. 16. Thus, detailed description thereof will be omitted.

Figure 20A:
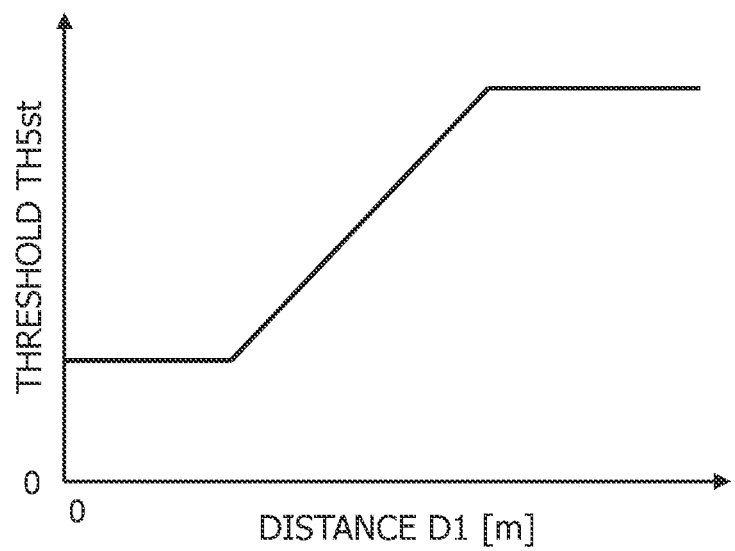
FIG. 20A is a graph illustrating the correlation between a threshold TH5$st$ and the distance D1 according to the fifth embodiment.

In step S908, arithmetic processing unit 130 specifies a higher threshold TH5*st* when the image coordinate pair (i, j) of interest specifies a position far from vehicle 200 in the longitudinal direction of vehicle 200 than when it specifies a position near vehicle 200 in the direction (see FIG. 20A).

Furthermore, in step S908, arithmetic processing unit 130 specifies a correction coefficient Krl for correcting the threshold TH5*st* in accordance with the distance D2 in the lateral direction of vehicle 200 from the predicted course to the position specified by the image coordinate pair (i, j), and uses a product of the threshold TH5*st* and the correction coefficient Krl as the threshold TH5 (TH5←TH5*st*×Krl).

Figure 20B:
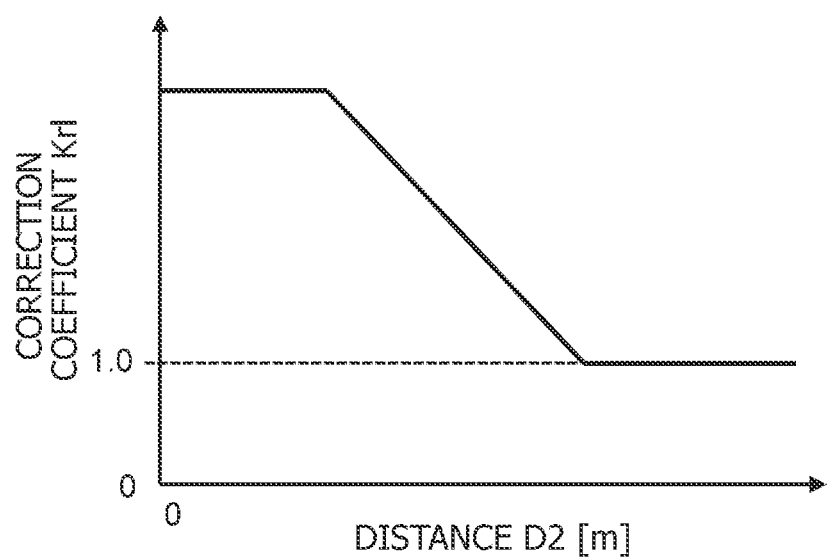
FIG. 20B is a graph illustrating the correlation between the distance D2 and a correction coefficient Krl for correcting the threshold TH5st according to the fifth embodiment.

FIG. 20B is a graph illustrating the correlation between the correction coefficient Krl (Krl>1.0) and the distance D2.

As shown in FIG. 20B, arithmetic processing unit 130 sets the correction coefficient Krl to a greater value and corrects the threshold TH5*st* upward to a higher value as the distance D2 is smaller; in other words, as the position indicated by the image coordinate pair (i, j) is closer to the center of the driving course of vehicle 200. On the other hand, when the position indicated by the image coordinate pair (i, j) is laterally away from the driving course of vehicle 200 by a predetermined distance or more, arithmetic processing unit 130 sets the correction coefficient Krl to 1 and uses the substantially uncorrected threshold TH5*st* as the threshold TH5.

In the next step S909, arithmetic processing unit 130 compares the threshold TH5 with the height H indicated by the image coordinate pair (i, j) of interest. When the height H exceeds the threshold TH5, arithmetic processing unit 130 identifies, in step S910, this image coordinate pair (i, j) as indicating a roadside object, and stores the position information and height information therefor in memory.

As an alternative, arithmetic processing unit 130 may specify the threshold TH5 by using a map or a function of variables representing the distance D1 in the longitudinal direction of vehicle 200 from vehicle 200 to the position indicated by the image coordinate pair (i, j) of interest and the distance D2 in the lateral direction of vehicle 200 from the predicted course to the position indicated by the image coordinate pair (i, j).

As yet another alternative, arithmetic processing unit 130 may calculate the threshold TH5 by specifying a threshold THst based on the distance D2 in the lateral direction of vehicle 200 from the predicted course to the position indicated by the image coordinate pair (i, j) of interest in accordance with the characteristics of FIG. 14 and correcting the threshold THst with a correction coefficient Kd1 set based on the distance D1 in the longitudinal direction of vehicle 200 from vehicle 200 to the position indicated by the image coordinate pair (i, j) of interest.

In this case, arithmetic processing unit 130 sets the correction coefficient Kd1 (Kd1>1.0) to a greater value as the distance D1 is greater; that is, as the distance from vehicle 200 to the position indicated by the image coordinate pair (i, j) of interest is greater.

Here, when, in the situation shown in FIG. 12, it is desired to prevent the steering control intervention from being triggered by obstacle 1 in the driver assistance for lane departure prevention, arithmetic processing unit 130 may prioritize the correction of the threshold TH5 based on the vehicle lateral position (the position of obstacle 1 in the lateral direction of vehicle 200; distance D2) over the correction of the threshold TH5 based on the vehicle longitudinal position (distance D1).

For example, in the configuration using the threshold TH5 calculated by correcting the threshold THst specified based on the distance D2 with the correction coefficient Kd1 set based on the distance D1, reducing the correction amount defined by the correction coefficient Kd1 will reduce or prevent false-positive detection in a distant area where images are captured with low pixel resolution, and will allow the threshold TH5 to vary mainly depending on the distance D2.

As yet another alternative, arithmetic processing unit 130 may specify a threshold TH5-1 based on the distance D1 in the longitudinal direction of vehicle 200 from vehicle 200 to the position indicated by the image coordinate pair (i, j) of interest in accordance with the characteristics of FIG. 5, and also specify a threshold TH5-2 based on the distance D2 in the lateral direction of vehicle 200 from the predicted course to the position indicated by the image coordinate pair (i, j) of interest in accordance with the characteristics of FIG. 14, and may compare the threshold TH5-1 with the threshold TH5-2 to use the greater of these as the threshold TH5.

In the processing for detecting roadside objects according to the fifth embodiment, in some cases, an obstacle lying near vehicle 200 in the longitudinal direction of vehicle 200 may be recognized as a roadside object, whereas an obstacle lying away from vehicle 200 in the direction may not be recognized as a roadside object even when these obstacles have the same height H. Furthermore, in some cases, an obstacle lying near the predicted course of vehicle 200 may not be recognized as a roadside object, whereas an obstacle lying away from the predicted course of vehicle 200 may be recognized as a roadside object even when these obstacles have the same height H and the same distance D1 from vehicle 200.

In other words, whether the individual curbstones of the substantially same height H are recognized as roadside objects or not depends on their respective positions in the longitudinal direction of vehicle 200 as well as depends on their respective positions relative to the predicted course in the lateral direction of vehicle 200. This reflects varying the reference height (threshold TH) for identifying an object as a roadside object in dependence on the vehicle longitudinal position of the object as well as on the distance D2 from the predicted course to the object in the processing for detecting roadside objects.

The technical concepts described in the above embodiments may be used in combination with each other as necessary, as long as no conflict arises.

Furthermore, although the present invention has been described in detail with reference to the preferred embodiments, it is apparent that the embodiments may be modified in various forms by one skilled in the art based on the fundamental technical concepts and teachings of the present invention.

For example, arithmetic processing unit 130 may calculate a threshold TH by performing combination of the processing for specifying a threshold TH in accordance with the distance D1 indicating the vehicle longitudinal position of a roadside object candidate and the processing for correcting the threshold TH in accordance with the steering angle and/or steering angular velocity.

Alternatively, arithmetic processing unit 130 may calculate a threshold TH by performing combination of the processing for specifying a threshold TH in accordance with the distance D2 from a roadside object candidate to the predicted course and the processing for correcting the threshold TH in accordance with the longitudinal acceleration.

As yet another alternative, the processing for specifying a threshold TH in accordance with the distance D1 indicating the vehicle longitudinal position of a roadside object candidate may be combined with the processing for specifying a threshold TH in accordance with the distance D2 from the roadside object candidate to the predicted course. In this case, arithmetic processing unit 130 may perform combination of this combined processing for specifying a threshold TH and either the processing for correcting the threshold TH in accordance with the steering angle and/or steering angular velocity or the processing for correcting the threshold TH in accordance with the longitudinal acceleration.

In the above embodiments, a stereo camera is used as external environment recognition unit 110. However, it is obvious that a system using a three-dimensional scanning laser radar is also able to detect roadside objects using the threshold TH specified as in any of the above embodiments.

Furthermore, arithmetic processing unit 130 may have a function to correct, in accordance with the brightness of an image area captured by external environment recognition unit 110, the threshold TH that is specified in accordance with the distance D1 in the vehicle longitudinal direction from vehicle 200 to a roadside object candidate and/or the distance D2 in the vehicle lateral direction from the predicted course to the roadside object candidate. In this case, arithmetic processing unit 130 is able to increase the threshold TH when the image area is dark as compared to when it is bright.

Correcting the threshold TH in accordance with the image brightness allows for addressing reduction in pixel resolution in a dark image area, and thus, allows for preventing false-positive detection.

Furthermore, arithmetic processing unit 130 may have a function to correct the threshold TH that is specified in accordance with the distance D1 in the vehicle longitudinal direction from vehicle 200 to a roadside object candidate and/or the distance D2 in the vehicle lateral direction from the predicted course to the roadside object candidate so as to increase the threshold TH when captured images are very blurry due to the rough road surface as compared to when captured images are less blurry due to the flat road surface.

This allows for preventing or reducing false-positive detection due to blurring of captured images caused by the rough road surface.

REFERENCE SYMBOL LIST

100 Roadside object detection system
110 External environment recognition unit
120 Driving condition variable sensing unit
130 Arithmetic processing unit (roadside object detection device)
200 Vehicle

The invention claimed is:

1. A roadside object detection device comprising:
a controller that is configured to:
determine a first feature value regarding a positional relationship between a host vehicle and a roadside object candidate and a second feature value regarding a height of the roadside object candidate, based on an external environment;
determine a height-related threshold for identifying the roadside object candidate as a roadside object, based on the first feature value; and
identify the roadside object candidate as the roadside object when the second feature value exceeds the threshold.

2. The roadside object detection device according to claim 1, wherein the controller increases the height-related threshold when the roadside object candidate is located far from the host vehicle in a longitudinal direction of the host vehicle as compared to when the roadside object candidate is located near the host vehicle in the longitudinal direction.

3. The roadside object detection device according to claim 2, wherein the controller increases the height-related threshold when speed or acceleration of the host vehicle is high as compared to when the speed or acceleration of the host vehicle is low.

4. The roadside object detection device according to claim 1,
wherein the first feature value is regarding positional relationship between the roadside object candidate and a predicted course of the host vehicle, the predicted course being based on a driving condition variable of the host vehicle, and
wherein the controller decreases the height-related threshold when the roadside object candidate is located far from the predicted course of the host vehicle in a lateral direction of the host vehicle as compared to when the roadside object candidate is located near the predicted course in the lateral direction.

5. The roadside object detection device according to claim 4,
wherein the controller determines a steering angle or a steering angular velocity of the host vehicle as the driving condition variable of the host vehicle, and
wherein the controller increases the height-related threshold when the steering angle or steering angular velocity is large as compared to when the steering angle or steering angular velocity is small.

6. The roadside object detection device according to claim 1, wherein the controller further increases the height-related threshold when a behavior of the host vehicle is large as compared to when the behavior of the host vehicle is small.

7. The roadside object detection device according to claim 1,
wherein the controller increases the height-related threshold when the roadside object candidate is located far from the host vehicle in a longitudinal direction of the host vehicle as compared to when the roadside object candidate is located near the host vehicle in the longitudinal direction; and
wherein the controller decreases the height-related threshold when the roadside object candidate is located far from the host vehicle in a lateral direction of the host vehicle as compared to when the roadside object candidate is located near the host vehicle in the lateral direction.

8. A roadside object detection device, wherein the roadside object detection device is configured to determine whether to recognize a roadside object candidate as a roadside object based on positional relationship between a host vehicle and a roadside object candidate in a driving direction of the host vehicle, the positional relationship being determined by an external environment recognize sensor, wherein
the roadside object detection device reduces probability of recognizing the roadside object candidate as the roadside object when the roadside object candidate is located far from the host vehicle in a longitudinal direction of the host vehicle as compared to when the roadside object candidate is located near the host vehicle in the longitudinal direction.

9. A roadside object detection device, wherein the roadside object detection device is configured to determine whether to recognize a roadside object candidate as a roadside object based on positional relationship between a host vehicle and a roadside object candidate in a driving direction of the host vehicle, the positional relationship being determined by an external environment recognize sensor, wherein
the roadside object detection device increases probability of recognizing the roadside object candidate as the roadside object when the roadside object candidate is located far from the host vehicle in a lateral direction of the host vehicle as compared to when the roadside object candidate is located near the host vehicle in the lateral direction.

10. A roadside object detection method comprising:
a roadside object feature value deriving step for determining a first feature value regarding positional relationship between a host vehicle and a roadside object candidate and a second feature value regarding a height of the roadside object candidate, based on external environment information acquired by a controller;
a roadside object threshold deriving step for determining a height-related threshold for identifying the roadside object candidate as a roadside object, based on the first feature value determined in the roadside object feature value deriving step; and
a roadside object identification step for identifying the roadside object candidate as the roadside object when the second feature value determined in the roadside object feature value deriving step exceeds the threshold determined in the roadside object threshold deriving step.

11. The roadside object detection method according to claim 10, wherein the roadside object threshold deriving step includes increasing the threshold when the roadside object candidate is located far from the host vehicle in a longitudinal direction of the host vehicle as compared to when the roadside object candidate is located near the host vehicle in the longitudinal direction.

12. The roadside object detection method according to claim 11, wherein the roadside object threshold deriving unit step includes increasing the threshold when speed or acceleration of the host vehicle determined by a controller is high as compared to when the speed or acceleration of the host vehicle is low.

13. The roadside object detection method according to claim 10,
wherein the first feature value is regarding positional relationship between the roadside object candidate and a predicted course of the host vehicle, the predicted course being based on a driving condition variable of the host vehicle determined by a controller, and
wherein the roadside object threshold deriving step includes decreasing the threshold when the roadside object candidate is located far from the predicted course of the host vehicle in a lateral direction of the host vehicle as compared to when the roadside object candidate is located near the predicted course in the lateral direction.

14. The roadside object detection method according to claim 13,
wherein the controller determines a steering angle or a steering angular velocity of the host vehicle as the driving condition variable of the host vehicle, and
wherein the roadside object threshold deriving step includes increasing the threshold when the steering angle or steering angular velocity is large as compared to when the steering angle or steering angular velocity is small.

15. The roadside object detection method according to claim 10, wherein the roadside object threshold deriving step further includes increasing the threshold when a behavior of the host vehicle determined by a driving condition variable sensing unit is large as compared to when the behavior of the host vehicle is small.

16. The roadside object detection method according to claim 10,
wherein the roadside object threshold deriving step includes:
increasing the threshold when the roadside object candidate is located far from the host vehicle in a longitudinal direction of the host vehicle as compared to when the roadside object candidate is located near the host vehicle in the longitudinal direction; and
decreasing the threshold when the roadside object candidate is located far from the host vehicle in a lateral direction of the host vehicle as compared to when the roadside object candidate is located near the host vehicle in the lateral direction.

17. A roadside object detection system comprising:
a controller configured to
acquire external environment information;
determine a first feature value regarding positional relationship between a host vehicle and a roadside object candidate and a second feature value regarding a height of the roadside object candidate, based on the external environment information;
determine a height-related threshold for identifying the roadside object candidate as a roadside object, based on the first feature value; and
identify the roadside object candidate roadside object when the second feature value exceeds the threshold.

18. The roadside object detection system according to claim 17, wherein the controller increases the threshold when the roadside object candidate is located far from the host vehicle in a longitudinal direction of the host vehicle as compared to when the roadside object candidate is located near the host vehicle in the longitudinal direction.

19. The roadside object detection system according to claim 17, wherein the controller is also configured to:
determine a driving condition variable of the host vehicle; and
predict a course of the host vehicle based on the driving condition variable,
wherein the first feature value is regarding positional relationship between the roadside object candidate and the course of the host vehicle, and
wherein the controller decreases the threshold when the roadside object candidate is located far from the predicted course of the host vehicle in a lateral direction of the host vehicle as compared to when the roadside object candidate is located near the predicted course in the lateral direction.

* * * * *